US009339799B2

(12) United States Patent
Kikuchi et al.

(10) Patent No.: US 9,339,799 B2
(45) Date of Patent: May 17, 2016

(54) HONEYCOMB STRUCTURE AND MANUFACTURING METHOD THEREOF

(71) Applicant: NGK Insulators, Ltd., Nagoya (JP)

(72) Inventors: Yoshio Kikuchi, Nagoya (JP); Hiroharu Kobayashi, Nagoya (JP); Kenichi Hidaka, Nagoya (JP); Miyuki Kojima, Nagoya (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/221,825

(22) Filed: Mar. 21, 2014

(65) Prior Publication Data

US 2014/0296055 A1    Oct. 2, 2014

(30) Foreign Application Priority Data

Mar. 29, 2013  (JP) ................................. 2013-075063

(51) Int. Cl.
*B01J 27/224* (2006.01)
*C04B 37/00* (2006.01)
(Continued)

(52) U.S. Cl.
CPC ........... *B01J 27/224* (2013.01); *B01D 46/2429* (2013.01); *B01D 46/2448* (2013.01); *C04B 35/565* (2013.01); *C04B 37/005* (2013.01); *C04B 38/0019* (2013.01); *C04B 2235/3481* (2013.01); *C04B 2235/383* (2013.01); *C04B 2235/3826* (2013.01); *C04B 2235/405* (2013.01); *C04B 2235/428* (2013.01); *C04B 2235/526* (2013.01); *C04B 2235/5228* (2013.01); *C04B 2235/5244* (2013.01); *C04B 2235/5248* (2013.01); *C04B 2235/5264* (2013.01); *C04B 2235/5284* (2013.01); *C04B 2235/5436* (2013.01); *C04B 2235/663* (2013.01); *C04B2235/80* (2013.01);
(Continued)

(58) Field of Classification Search
None
See application file for complete search history.

(56) References Cited

U.S. PATENT DOCUMENTS

2010/0048374 A1    2/2010  Liu et al.
2011/0250382 A1*  10/2011  Ido ..................... B01D 46/2425
                                                                      428/116

FOREIGN PATENT DOCUMENTS

EP    2 374 773 A1    10/2011
EP    2 554 265 A1     2/2013
(Continued)

OTHER PUBLICATIONS

Extended European Search Report (Application No. 14161129.3) dated Feb. 3, 2015.
U.S. Appl. No. 14/221,779, filed Mar. 21, 2014, Kikuchi et al.
Shigeo Hayashi et al., "*Accuracy in the Quantitative Phase Analysis of Eight- to Ten-Component Ceramic Materials Using the Whole-Powder-Pattern Fitting Methods*," Journal of the Ceramic Society of Japan, 1999, vol. 107, No. 3, pp. 249-257.

*Primary Examiner* — Colin W Slifka
(74) *Attorney, Agent, or Firm* — Burr & Brown, PLLC

(57) ABSTRACT

To provide a honeycomb structure capable of using as a catalyst carrier, which functions as a heater, and where a bonding layer is hard to break and an electrical resistance value is hard to rise; including a honeycomb segment bonded body where honeycomb segments are bonded by bonding layer, and a pair of electrode members disposed on a side surface of the bonded body, the electrode members is formed into a band shape, and in a cross section perpendicular to the cell extending direction, one electrode member is disposed on an opposite side across the center of the bonded body to another electrode member, and in at least a part of the bonding layer, inorganic fibers made of β-SiC and a metal silicide are included in a porous body where silicon carbide are bound with silicon in a state where pores are held among the particles.

18 Claims, 8 Drawing Sheets

(51) Int. Cl.
*C04B 38/00* (2006.01)
*C04B 35/565* (2006.01)
*B01D 46/24* (2006.01)
*F01N 3/20* (2006.01)

(52) U.S. Cl.
CPC ...... *C04B 2235/96* (2013.01); *C04B 2237/083* (2013.01); *C04B 2237/16* (2013.01); *C04B 2237/365* (2013.01); *C04B 2237/597* (2013.01); *F01N 3/2026* (2013.01)

(56) References Cited

FOREIGN PATENT DOCUMENTS

| | | | |
|---|---|---|---|
| JP | 2010-229976 | A1 | 10/2010 |
| JP | 2011-098866 | A1 | 5/2011 |
| JP | 2012-188958 | A1 | 10/2012 |

* cited by examiner

HONEYCOMB STRUCTURE AND MANUFACTURING METHOD THEREOF

The present application is an application based on JP-2013-075063 filed on Mar. 29, 2013 with the Japanese Patent Office, the entire contents of which are incorporated herein by reference.

BACKGROUND OF THE INVENTION

1. Field of the Invention

The present invention relates to a honeycomb structure and a manufacturing method thereof. More particularly, it relates to a honeycomb structure capable of being used as a catalyst carrier, which functions as a heater by applying a voltage, and a manufacturing method thereof.

2. Description of Related Art

Heretofore, a honeycomb structure made of cordierite on which a catalyst is loaded has been used in a disposal of harmful substances in an exhaust gas discharged from a car engine. Moreover, a honeycomb structure formed by a sintered body of silicon carbide has been used in purification of the exhaust gas.

When the exhaust gas is treated by the catalyst loaded on the honeycomb structure, it is necessary to raise a temperature of the catalyst to a predetermined temperature. However, at start of the engine, the catalyst temperature is low, and hence it has caused the problem that the exhaust gas is not sufficiently purified.

Thus, there has been investigated a catalyst converter including a catalyst carrier to be heated by energization, and electrodes, wherein the catalyst carrier is constituted of a plurality of segments arranged in a direction perpendicular to a straight line connecting the centers of the respective electrodes to each other (e.g., see Patent Document 1). In the catalyst converter, each of volume resistivity of the above plurality of segments is varied, thereby attempting to uniformize amount of heat generated by the energization.

Furthermore, there has also been suggested a honeycomb structure including a plurality of conductive segment sintered parts each having a honeycomb structure, and a joint material sintered part which joins the above conductive segment sintered parts to each other (e.g., see Patent Document 2).

[Patent Document 1] JP-A-2012-188958
[Patent Document 2] JP-A-2011-98866

SUMMARY OF THE INVENTION

In a catalyst converter described in Patent Document 1, each of volume resistivity of a plurality of segments needs to be different from one another, and hence a load on production tends to be large. Furthermore, in Patent Document 2, it is described that segment sintered parts and the joint material sintered part are conductive, but specific conditions of the volume resistivity and the like are not described. Usually, as to conditions and the like for each use application, various problems and the like are present, and hence it has caused the problem that implementation is difficult.

Furthermore, in Patent Document 2, it is described that an elasticity of the joint material sintered part (joining layer) is not required, but heat stress is generated in the joining layer sometimes in accordance with use conditions (e.g., a case where an exhaust gas of a high temperature flows inside). In this case, if any elasticity does not exist in the joining layer, there is a problem that partition walls which are low strength portions break down. On the other hand, when the elasticity of the joining layer is lowered, the stress is relaxed, but the strength is low, and hence it has caused a problem that the joining layer is broken. Furthermore, when the stress is applied to the joint material sintered part, there is a problem that an electrical resistance value of a portion joined by the joint material sintered part rises, even if the breakage does not occur. In particular, when stress such as bending stress is applied to the joint material sintered part, the electrical resistance value (hereinafter, also referred to simply as "the resistance value") of the portion joined by the joint material sintered part noticeably rises sometimes. When the electrical resistance value of the portion joined by the joint material sintered part rises, flow of current through the joint material sintered part is inhibited, the current does not evenly flow to the respective segment sintered parts, and a honeycomb structure is uniformly not generated heat.

The present invention has been developed in view of the above-mentioned problems, and an object thereof is to provide a honeycomb structure capable of being used as a catalyst carrier, which also functions as a heater suitably by applying a voltage, and a manufacturing method thereof. In particular, there are provided a honeycomb structure in which a bonding layer of a honeycomb segment bonded body is hardly broken against stress and in which even when the stress is applied, an electrical resistance value of a portion bonded by the bonding layer hardly rises, and a manufacturing method thereof.

To achieve the above-mentioned problem, according to the present invention, there are provided the following honeycomb structure and manufacturing method thereof.

According to one aspect of the present invention, a honeycomb structure including a tubular honeycomb segment bonded body having a plurality of tubular honeycomb segments having porous partition walls defining a plurality of cells as through channels of a fluid which extend from a first end face as one end face to a second end face as another end face is provided, and a bonding layer which bonds side faces of the plurality of honeycomb segments to each other; and a pair of electrode members disposed on a side face of the honeycomb segment bonded body, wherein volume resistivities of the respective honeycomb segments of the honeycomb segment bonded body are from 1 to 200 Ωcm, at least a part of the bonding layer is made of a bonding material having conductive property, a volume resistivity of the bonding layer is from 2 to 2000 Ωcm, each of the pair of electrode members is formed into a band shape extending in an extending direction of the cells of the honeycomb segment, and in a cross section perpendicular to the extending direction of the cells, the one electrode member in the pair of electrode members is disposed on an opposite side across the center of the honeycomb segment bonded body with respect to another electrode member in the pair of electrode members, and in at least a part of the bonding layer, conductive inorganic fibers made of β-SiC and a metal silicide are included in a porous body where particles of silicon carbide as an aggregate are bound with silicon as a binding material in a state where pores are held among the particles.

According to a second aspect of the present invention, the honeycomb structure according to the above first aspect is provided, wherein the metal silicide is nickel silicide.

According to a third aspect of the present invention, the honeycomb structure according to the above first or second aspects is provided, wherein in a region of the bonding layer where the conductive inorganic fibers are included, a volume ratio of the conductive inorganic fibers to a total volume of the silicon, the silicon carbide, the conductive inorganic fibers and the metal silicide included in the bonding layer is from 15 to 35 vol %.

According to a fourth aspect of the present invention, the honeycomb structure according to any one of the above first to third aspects is provided, wherein a ratio (a number ratio) of the hollow conductive inorganic fibers among the conductive inorganic fibers is 30% or less.

According to a fifth aspect of the present invention, the honeycomb structure according to any one of the above first to fourth aspects is provided, wherein an average fiber length of the conductive inorganic fibers is 0.3 mm or more.

According to a sixth aspect of the present invention, the honeycomb structure according to any one of the above first to fifth aspects is provided, wherein an average fiber diameter of the conductive inorganic fibers is from 2 to 30 μm.

According to a seventh aspect of the present invention, the honeycomb structure according to any one of the above first to sixth aspects is provided, wherein the conductive inorganic fibers are the conductive inorganic fibers made of β-SiC in which carbon fibers are silicified.

According to an eighth aspect of the present invention, the honeycomb structure according to any one of the above first to seventh aspects is provided, wherein a volume ratio of a total volume of the silicon and the metal silicide to the total volume of the silicon, the silicon carbide, the conductive inorganic fibers and the metal silicide included in the bonding layer is from 20 to 50 vol %.

According to a ninth aspect of the present invention, the honeycomb structure according to any one of the above first to eight aspects is provided, wherein a volume ratio of the metal silicide to the total volume of the silicon, the silicon carbide, the conductive inorganic fibers and the metal silicide included in the bonding layer is from 1 to 10 vol %.

According to a tenth aspect of the present invention, the honeycomb structure according to any one of the above first to ninth aspects are provided, wherein a volume ratio of the silicon carbide to the total volume of the silicon, the silicon carbide, the conductive inorganic fibers and the metal silicide included in the bonding layer is from 20 to 50 vol %.

According to an eleventh aspect of the present invention, the honeycomb structure according to any one of the above first to tenth aspects is provided, wherein an average particle diameter of the particles of the silicon carbide included in the bonding layer is from 10 to 60 μm.

According to a twelfth aspect of the present invention, the honeycomb structure according to any one of the above first to eleventh aspects is provided, wherein the silicon carbide as the aggregate is α-SiC.

According to a thirteenth aspect of the present invention, the honeycomb structure according to any one of the above first to twelfth aspects is provided, wherein the bonding layer further includes an oxide made of an alkaline earth metal oxide, $Al_2O_3$ and $SiO_2$.

According to a fourteenth aspect of the present invention, the honeycomb structure according to the above thirteenth aspect is provided, wherein the alkaline earth metal oxide is MgO.

According to a fifteenth aspect of the present invention, honeycomb structure according to the above thirteenth or fourteenth aspects is provided, wherein the oxide of 1 to 10 parts by volume are included when the total volume of the silicon, the silicon carbide, the conductive inorganic fibers and the metal silicide included in the bonding layer is 100 parts by volume.

According to a sixteenth aspect of the present invention, the honeycomb structure according to any one of the above first to fifteenth aspects is provided, wherein a porosity of the bonding layer is from 60 to 80%.

According to a seventeenth aspect of the present invention, a manufacturing method of a honeycomb structure including a tubular honeycomb segment bonded body having a plurality of tubular honeycomb segments having porous partition walls defining a plurality of cells as through channels of a fluid which extend from a first end face as one end face to a second end face as another end face is provided, and a bonding layer which bonds side faces of the plurality of honeycomb segments to each other; and a pair of electrode members disposed on a side face of the honeycomb segment bonded body, wherein as a bonding material to form the bonding layer, there is used a material including silicon carbide powder, silicon powder, carbon fibers, and powder made of at least one of a metal of at least one selected from a group consisting of nickel and zirconium, and a metal compound containing a metal element of the at least one selected from the group.

According to an eighteenth aspect of the present invention, the manufacturing method of the honeycomb structure according to the above seventeenth aspect is provided, wherein the metal compound containing the metal element of the at least one selected from the group consisting of nickel and zirconium is at least one of a metal oxide and a metal silicide.

A honeycomb structure of the present invention is a honeycomb structure including a tubular honeycomb segment bonded body as a heating element, and a pair of electrode members disposed on a side face of the honeycomb segment bonded body. The honeycomb segment bonded body has a plurality of tubular honeycomb segments, and a bonding layer which bonds side faces of the plurality of honeycomb segments to each other. The honeycomb segments have porous partition walls defining a plurality of cells as through channels of a fluid which extend from a first end face to a second end face. Moreover, volume resistivities of the respective honeycomb segments of the honeycomb segment bonded body are from 1 to 200 Ωcm, and a volume resistivity of the bonding layer is from 2 to 2000 Ωm. Furthermore, each of the pair of electrode members is formed into a band shape extending in an extending direction of the cells of the honeycomb segments. In a cross section perpendicular to the extending direction of the cells, one electrode member in the pair of electrode members is disposed on an opposite side across the center of the honeycomb segment bonded body with respect to the another electrode member in the pair of electrode members. Furthermore, in the bonding layer which bonds the plurality of honeycomb segments together, conductive inorganic fibers made of β-SiC and a metal silicide are included in a porous body where particles of silicon carbide as an aggregate are bound with silicon as a binding material in a state where pores are held among the particles. The honeycomb structure of the present invention having such a constitution can be used as a catalyst carrier, and also functions as a heater suitably by applying a voltage. Furthermore, in the honeycomb structure of the present invention, the bonding layer relaxes stress, and is hard to break further against the stress, and furthermore when the stress is applied to the honeycomb structure, an electrical resistance value of a portion bonded by the bonding layer is hard to rise. That is, when stress such as bending stress is applied, the electrical resistance value of the portion bonded by the bonding layer is hard to rise. Therefore, current flows suitably through the whole honeycomb segment bonded body via the bonding layer, so that it is possible to generate a heat uniformly to a honeycomb segment bonded body. Moreover, the honeycomb structure of the present invention is also superior in thermal shock resistance. Furthermore, in a manufacturing method of the honeycomb structure of the present invention, the above-mentioned honeycomb structure of the present invention can simply be manufactured.

DETAILED DESCRIPTION OF THE INVENTION

Figure 1:
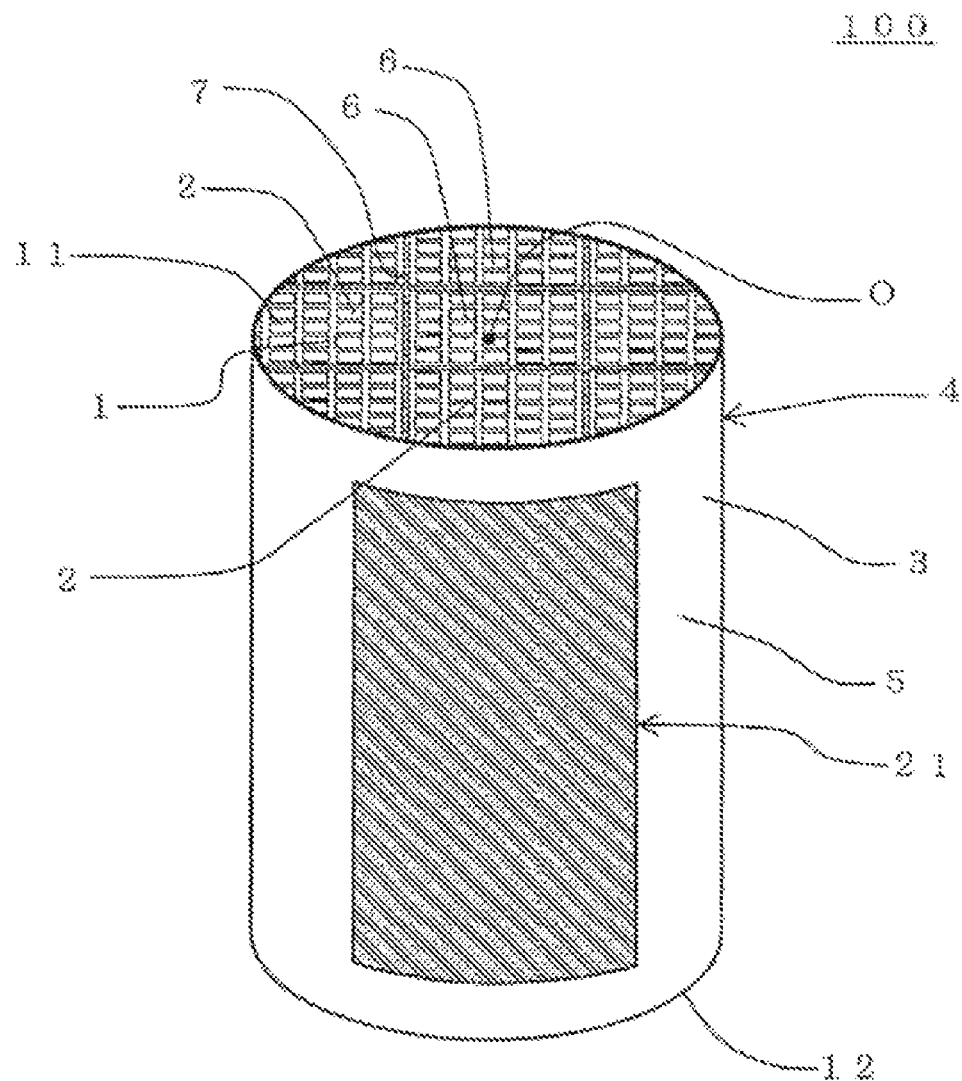
FIG. 1 is a perspective view schematically showing one embodiment of a honeycomb structure of the present invention.

Next, modes for carrying out the present invention will be described in detail with reference to the drawings. It should be understood that the present invention is not limited to the following embodiments and that design changes, improvements and the like are suitably added on the basis of ordinary knowledge of a person skilled in the art without departing from the gist of the present invention.

(1) Honeycomb Structure:

As shown in FIG. 1 to FIG. 5, one embodiment of a honeycomb structure of the present invention includes a tubular honeycomb segment bonded body 4 as a heating element, and a pair of electrode members 21, 21 disposed on a side face 5 of the honeycomb segment bonded body 4. Furthermore, the tubular honeycomb segment bonded body 4 has a plurality of tubular honeycomb segments 6, and a bonding layer 7 which bonds side faces of the plurality of honeycomb segments 6 to each other. Furthermore, the tubular honeycomb segments 6 have porous partition walls 1 defining a plurality of cells 2 as through channels of a fluid which extend from a first end face 11 as one end face to a second end face 12 as another end face. Furthermore, volume resistivities of the respective honeycomb segments 6 of the honeycomb segment bonded body 4 are from 1 to 200 $\Omega$cm. Furthermore, at least a part of the bonding layer 7 is made of a bonding material having conductive property. Furthermore, a volume resistivity of the bonding layer 7 is from 2 to 2000 $\Omega$cm. Furthermore, each of the pair of electrode members 21, 21 is formed into a band shape extending in an extending direction of the cells 2 of the honeycomb segments 6. Furthermore, as to the pair of electrode members 21 and 21, in a cross section perpendicular to the extending direction of the cells 2, one electrode member 21 in the pair of electrode members 21 and 21 is disposed on an opposite side across a center O of the honeycomb segment bonded body 4 with respect to another electrode member 21 in the pair of electrode members 21 and 21. Furthermore, in at least a part of the bonding layer 7, conductive inorganic fibers made of β-SiC and a metal silicide are included in a porous body where particles of silicon carbide as an aggregate are bound with silicon as a binding material in a state where pores are held among the particles.

In a honeycomb structure 100 of the present embodiment, the volume resistivities of the respective honeycomb segments 6 of the honeycomb segment bonded body 4 are from 1 to 200 $\Omega$m, and hence the respective honeycomb segments 6 generate heat by energization. Furthermore, in the honeycomb structure 100, at least a part of the bonding layer 7 which bonds the honeycomb segments 6 is made of "the bonding material having conductive property". Furthermore, in at least a part of the bonding layer 7 which bonds the honeycomb segments 6, the conductive inorganic fibers made of β-SiC and the metal silicide are included in the porous body where the particles of silicon carbide as the aggregate are bound with silicon as the binding material in the state where the pores are held among the particles. As described above, in the honeycomb structure 100 of the present embodiment, honeycomb structural portions as substantive heat element are not integrally formed, but are constituted of the honeycomb segment bonded body 4 where the plurality of honeycomb segments 6 are bonded together by the conductive bonding layer 7. Therefore, it is possible to relax stress generated in the honeycomb segment bonded body 4 by the bonding layer 7. For example, in the case of occurring rapid heating or rapid cooling, it is possible to suppress the generation of large stress in the honeycomb segment bonded body 4. Furthermore, the bonding layer 7 where the conductive inorganic fibers made of β-SiC are included as described above has a low volume resistivity, and hence flow of current is not disturbed by the bonding layer 7. Furthermore, the bonding layer 7 where the conductive inorganic fibers made of β-SiC are included relaxes the stress, and is hard to break further against the stress, and furthermore when the stress is applied, an electrical resistance value of a portion bonded by the bonding layer 7 is hard to rise. That is, when stress such as bending stress is applied, the electrical resistance value of the portion bonded by the bonding layer 7 is hard to rise. Therefore, the current flows suitably through the whole honeycomb segment bonded body 4 via the bonding layer 7, so that it is possible to generate a heat uniformly to the honeycomb segment bonded body 4. Moreover, since the bonding layer 7 contains the metal silicide, the conductive inorganic fibers made of β-SiC are easily formed in the bonding layer 7 and so the volume resistivity of the bonding layer 7 can be suitably decreased.

In the honeycomb structure 100 of the present embodiment, each of the pair of electrode members 21, 21 is formed into the band shape extending in the extending direction of the cells 2. Furthermore, in the cross section of the honeycomb structure 100 being perpendicular to the extending direction of the cells 2, the one electrode member 21 in the pair of electrode members 21, 21 is disposed on the opposite side across the center O of the honeycomb segment bonded body 4 with respect to another electrode member 21 in the pair of electrode members 21, 21. Therefore, it is possible to suppress deviation of temperature distribution of the honeycomb segment bonded body 4 when a voltage is applied between the pair of electrode members 21, 21.

Figure 2:
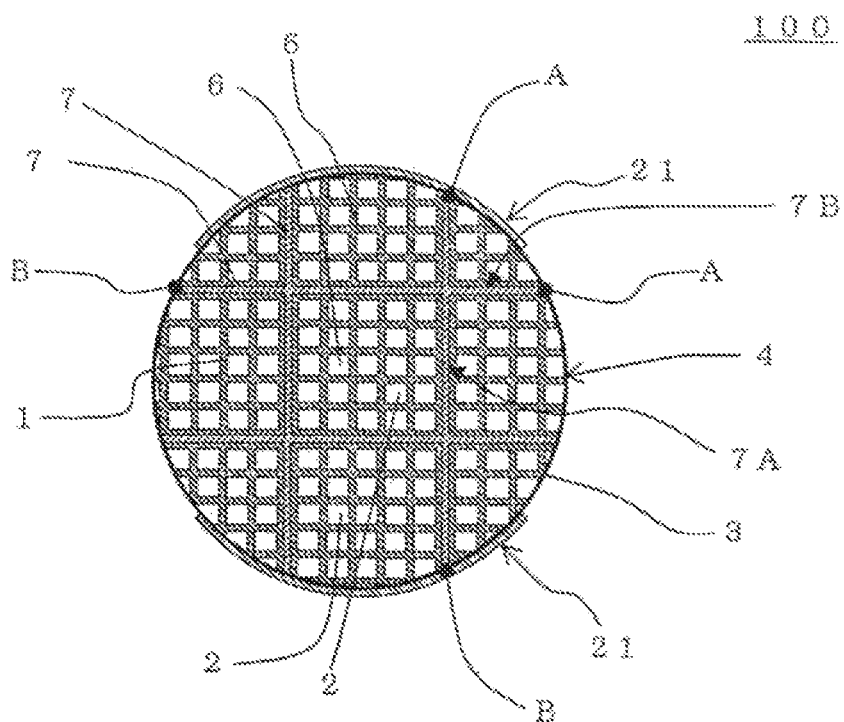
FIG. 2 is a schematic view showing a cross section perpendicular to an extending direction of cells in the one embodiment of the honeycomb structure of the present invention.
Figure 3:
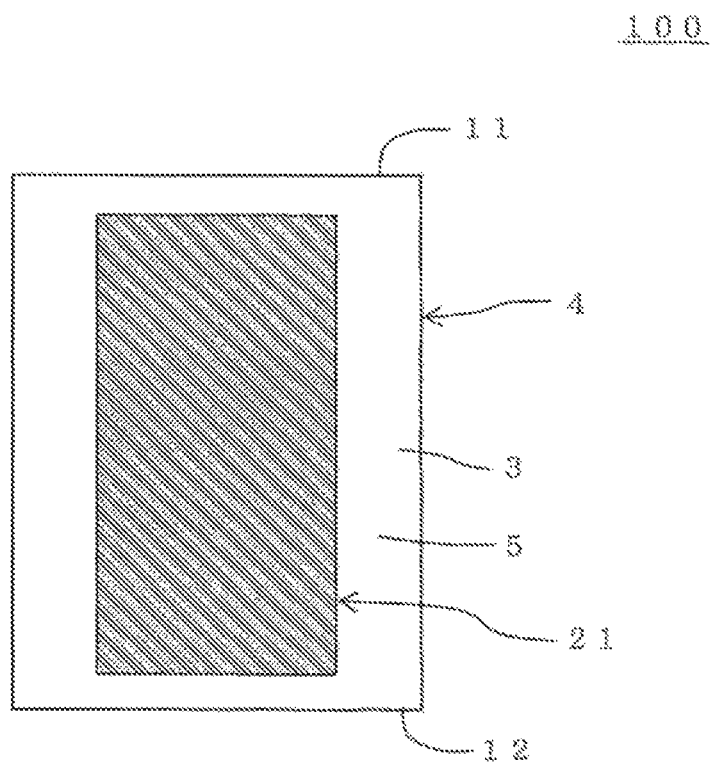
FIG. 3 is a front view schematically showing the one embodiment of the honeycomb structure of the present invention.
Figure 4:
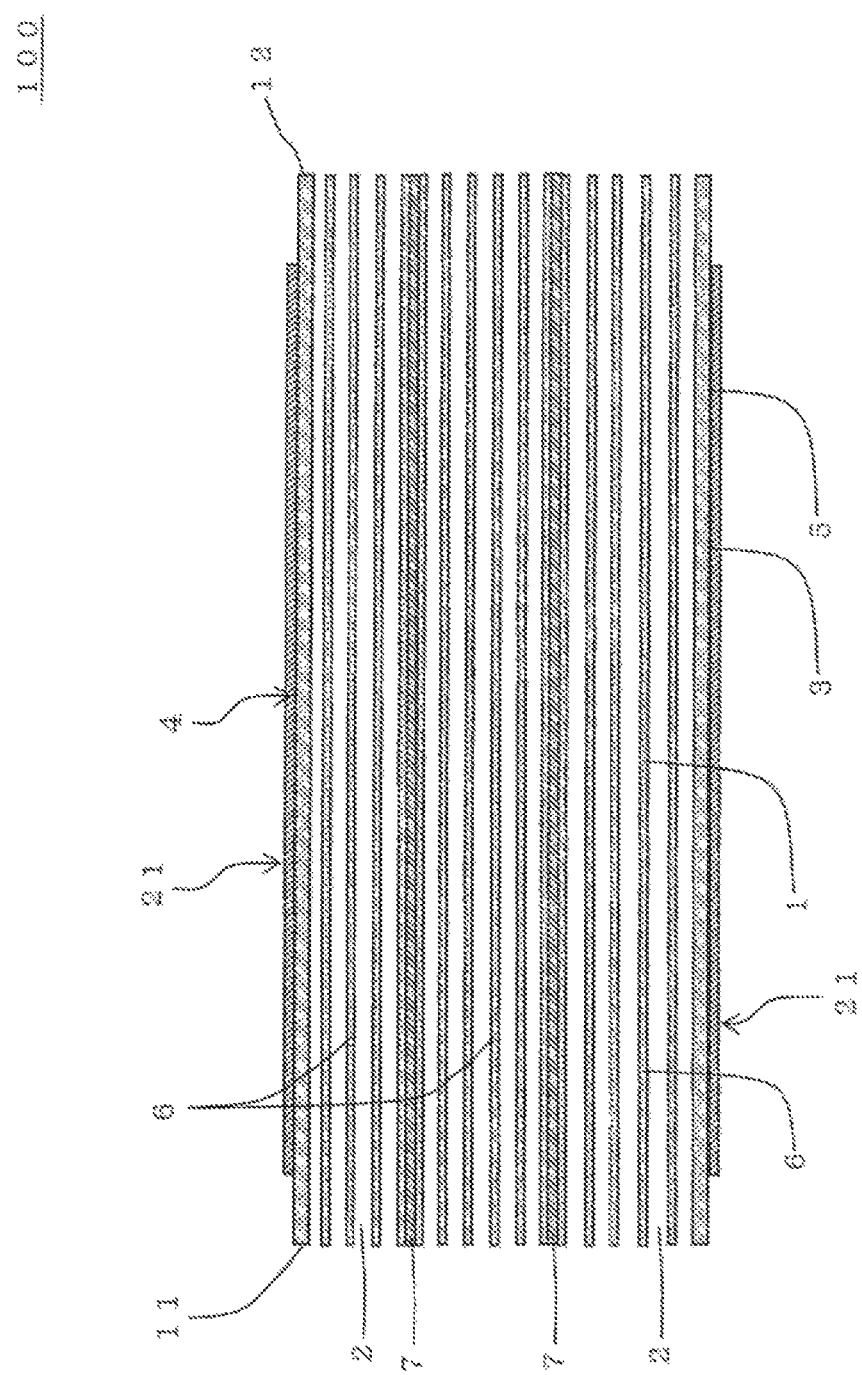
FIG. 4 is a schematic view showing a cross section parallel to the extending direction of cells in the one embodiment of the honeycomb structure of the present invention.
Figure 5:
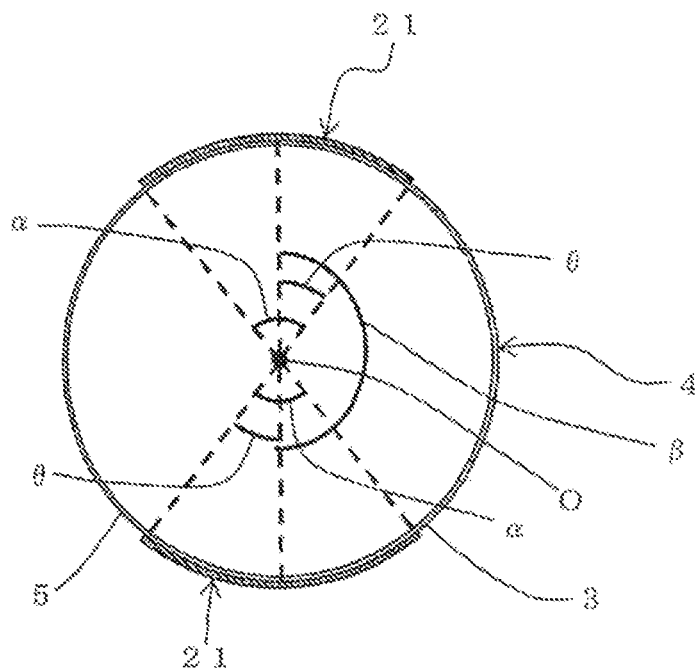
FIG. 5 is a schematic view showing the cross section perpendicular to the extending direction of cells in the one embodiment of the honeycomb structure of the present invention.

Here, FIG. 1 is a perspective view schematically showing the one embodiment of the honeycomb structure of the present invention. FIG. 2 is a schematic view showing the cross section perpendicular to the extending direction of cells in the one embodiment of the honeycomb structure of the present invention. FIG. 3 is a front view schematically showing the one embodiment of the honeycomb structure of the present invention. FIG. 4 is a schematic view showing a cross section parallel to the extending direction of cells in the one embodiment of the honeycomb structure of the present invention. FIG. 5 is a schematic view showing the cross section perpendicular to the extending direction of cells in the one embodiment of the honeycomb structure of the present invention. In FIG. 5, the partition walls are omitted.

Here, "the cross section perpendicular to the extending direction of the cells 2" is simply referred to as "the cross section" sometimes. Moreover, "the one electrode member 21 in the pair of electrode members 21, 21" is simply referred to as the one electrode member 21" sometimes. Furthermore, "another electrode member 21 in the pair of electrode members 21, 21" is simply referred to as "another electrode member 21" sometimes. Furthermore, in the cross section, an angle formed by "a line segment connecting a center point of the one electrode member 21 to the center O of the honeycomb segment bonded body 4" and "a line segment connecting a center point of another electrode member 21 to the center O of the honeycomb segment bonded body 4" is an angle $\beta$. The angle $\beta$ is an angle around "the center O". At this time, the phrase that "in the cross section, the one electrode member 21 is disposed on the opposite side across the center O of the honeycomb segment bonded body 4 with respect to another electrode member 21" means the following things. That is, as shown in FIG. 5, it is meant that in the cross section, the pair of electrode members 21, 21 is disposed at the honeycomb segment bonded body 4 in such a positional relation that the angle $\beta$ is in a range of 170° to 190°. It is to be noted that "the center point of the one electrode member 21" is a point of the center of the one electrode member 21 in "a peripheral direction of the honeycomb segment bonded body 4". Furthermore, "the center point of another electrode member 21" is a point of the center of another electrode member 21 in "the peripheral direction of the honeycomb segment bonded body 4".

In the honeycomb structure 100 of the present embodiment, a material of the honeycomb segments 6 preferably contains a silicon-silicon carbide composite material or a silicon carbide material as a main component, and is further preferably the silicon-silicon carbide composite material or the silicon carbide material. "The material of the honeycomb segments 6" is the material of the partition walls 1 of the honeycomb segments 6 and side faces (outer walls) of the honeycomb segments 6. Furthermore, "the main component" is a component containing 90 mass or more to the whole material. By use of such a material, the volume resistivities of the respective honeycomb segments 6 can be from 1 to 200 $\Omega$cm. Here, the silicon-silicon carbide composite material contains silicon carbide particles as the aggregate and silicon as the binding material which binds the silicon carbide particles, and the plurality of silicon carbide particles are preferably bound with silicon so as to form the pores among the silicon carbide particles. Furthermore, the silicon carbide material is formed by sintering the silicon carbide particles with each other.

In at least a part of the bonding layer 7, the conductive inorganic fibers made of $\beta$-SiC and the metal silicide are included in the porous body where the particles of silicon carbide as the aggregate are bound with silicon as the binding material in the state where the pores are held among the particles. It is to be noted that an example of "the porous body where the particles of silicon carbide as the aggregate are bound with silicon as the binding material in the state where the pores are held among the particles" is "the silicon-silicon carbide composite material" described in the material of the honeycomb segments 6. Hereinafter, the bonding layer 7 having the above constitution will be referred to as "the bonding layer where the conductive inorganic fibers made of $\beta$-SiC and the metal silicide are included in the porous body made of the silicon-silicon carbide composite material", or simply "the bonding layer where the conductive inorganic fibers and the metal silicide are included" sometimes. Furthermore, hereinafter, the conductive inorganic fibers made of $\beta$-SiC included in the bonding layer 7 will simply be referred to as "the conductive inorganic fibers" sometimes.

The whole bonding layer 7 may be "the bonding layer where the conductive inorganic fibers and the metal silicide are included". Furthermore, a part of the bonding layer 7 may be "the bonding layer where the conductive inorganic fibers and the metal silicide are included" and the other part thereof may be "the bonding layer where at least one of the conductive inorganic fibers and the metal silicide is not included". However, in the honeycomb structure 100 of the present embodiment, when the voltage is applied between the pair of electrode members 21 and 21, current preferably flows from the one electrode member 21 to another electrode member 21 through the honeycomb segments 6 and the bonding layer 7. Furthermore, it is preferable to have such a constitution that current preferably flows through all of the plurality of honeycomb segments 6. For example, when a part of the bonding layer 7 is formed by a bonding material having non-conductive property, it is preferable to avoid that "any of the honeycomb segments 6 are insulated electrically isolated by the non-conductive bonding layer". Therefore, the whole bonding layer 7 is more preferably "the bonding layer where the conductive inorganic fibers and the metal silicide are included". Hereinafter, in the honeycomb structure of the present embodiment, when simply referring to as "the bonding layer" unless otherwise specified, "the bonding layer where the conductive inorganic fibers and the metal silicide are included" is meant.

There is not any special restriction on the metal silicide included in the bonding layer 7, but examples of the metal silicide include nickel silicide ($NiSi_2$) and zirconium silicide ($ZrSi_2$). As the metal silicide included in the bonding layer 7, nickel silicide is preferable. By including nickel silicide, a rise ratio of the resistance value becomes smaller during the application of stress to the bonding layer 7. Hereinafter, the rise ratio of the resistance value during the application of stress to the bonding layer 7 will be referred to as "the resistance rise ratio" of the bonding layer 7 sometimes.

In a region of the bonding layer 7 where the conductive inorganic fibers are included, a volume ratio of the conductive inorganic fibers to a total volume of silicon, silicon carbide, the conductive inorganic fibers and metal silicide included in the bonding layer 7 is preferably from 15 to 35 vol %. Furthermore, the volume ratio of the conductive inorganic fibers is further preferably from 20 to 35 vol %, and especially preferably from 25 to 35 vol %. When the volume ratio of the conductive inorganic fibers is within the above numeric range, breaking-resistance property can be enhanced, and the strength of the bonding layer 7 can suitably maintained while lowering the resistance rise ratio. For example, when the volume ratio of the conductive inorganic fibers is in excess of 35 vol %, the strength of the bonding layer 7 deteriorates sometimes. Furthermore, it becomes difficult to adjust the desirable resistivity. Furthermore, when the volume ratio of the conductive inorganic fibers is smaller than 15 vol %, the breaking-resistance property of the bonding layer 7 deteriorates sometimes, and the resistance rise ratio increases sometimes. "The region of the bonding layer 7 where the conductive inorganic fibers are included" is a region where the conductive inorganic fibers exist in a thickness direction of the bonding layer. Here, the phrase of "the conductive inorganic fibers exist in the thickness direction of the bonding layer" means that the conductive inorganic fibers are confirmed in a view field with a width of 5 mm in a sectional SEM image of a cross section of the thickness direction of the bonding layer. Therefore, when any conductive inorganic fibers are not confirmed in the view field with the width of 5 mm in the above sectional SEM image, the corresponding region is "the region of the bonding layer 7 where any conductive inorganic fibers are not included".

The conductive inorganic fibers may be solid conductive inorganic fibers or hollow conductive inorganic fibers. The solid conductive inorganic fibers are the conductive inorganic fibers where voids and the like are not formed in a cross section cut by a plane perpendicular to a longitudinal direction of the conductive inorganic fibers. The hollow conductive inorganic fibers are the conductive inorganic fibers where envelopes are only made of an inorganic material and the insides of the fiber are the voids. In the conductive inorganic fibers, a ratio of the hollow conductive inorganic fibers (a number ratio) is preferably from 0 to 30%, further preferably from 0 to 20%, and especially preferably from 0 to 10%. When the ratio of the hollow conductive inorganic fibers is within the above numeric range, the resistance rise ratio can be reduced. The ratio of the hollow conductive inorganic fibers can be obtained by photographing cross sections of the conductive inorganic fibers by a scanning type electron microscope (SEM). Specifically, the cross sections of 50 conductive inorganic fibers included in the bonding layer are photographed at a magnification of 200 times, and the number of the hollow conductive inorganic fibers in the 50 conductive inorganic fibers is counted. Then, a ratio (the percentage) of the number of the hollow conductive inorganic fibers to the 50 conductive inorganic fibers is "the ratio of the hollow conductive inorganic fibers".

An average fiber length of the conductive inorganic fibers included in the bonding layer 7 is preferably 0.3 mm or more, further preferably from 0.3 to 5 mm, and especially preferably from 1 to 5 mm. When the average fiber length of the conductive inorganic fibers is 0.3 mm or more, the breaking-resistance property of the bonding layer 7 enhance and further the resistance rise ratio can be reduced. The average fiber length of the conductive inorganic fibers is a value measured by the following method. First, the bonding layer is photographed by the scanning type electron microscope (SEM). It is to be noted that the photographed image by the scanning type electron microscope is obtained by photographing a view field of 0.5 mm×20 mm at a magnification of 200 times. Next, the photographed sectional image is analyzed by analysis software (Image-Pro (trade name) manufactured by Nihon Visual Science Co., Ltd.), and lengths (fiber lengths) of the conductive inorganic fibers included in the bonding layer are measured. The measurement of the fiber lengths of the conductive inorganic fibers is performed by measuring 50 points of the fiber lengths of conductive inorganic fibers reflected in the sectional image at random. An average value of the measured fiber lengths is the average fiber length of the conductive inorganic fibers included in the bonding layer 7. It is to be noted that average fiber length of the conductive inorganic fibers may be measured the conductive inorganic fibers, or fiber length of fibers to be the conductive inorganic fibers in the bonding layer at a stage of a raw material. That is, in the stage of the raw material, the average fiber length can also be obtained from an image formed when the fibers are only photographed by the scanning type electron microscope. Since the average fiber length and an average fiber diameter of the conductive inorganic fibers hardly change between a state of the raw material and a state of being contained in the bonding layer 7, when the fibers used in the bonding layer 7 are known, the fibers are measured alone to obtain the average fiber length of the conductive inorganic fibers. For similar reasons, the average fiber diameter of the conductive inorganic fibers can also be obtained from an image formed when the fibers in the stage of the raw material are only photographed by the scanning type electron microscope. For example, carbon fibers are used as the raw material of the conductive inorganic fibers, and even if the carbon fibers are silicified into the conductive inorganic fibers made of β-SiC in a firing step of a manufacturing process, the average fiber length and average fiber diameter thereof hardly change. It is to be noted that when a reaction ratio of the carbon fibers is low, the hollow conductive inorganic fibers are formed sometimes, but it can be said that influence on the average fiber length and average fiber diameter are remarkably little.

The average fiber diameter of the conductive inorganic fibers included in the bonding layer 7 is preferably from 2 to 30 and further preferably from 5 to 15 μl. The average fiber diameter of the conductive inorganic fibers is a value measured by the following method. First, the bonding layer is photographed by the scanning type electron microscope (SEM). Next, the photographed sectional image is analyzed by the analysis software (Image-Pro (trade name) manufactured by Nihon Visual Science Co., Ltd.), and diameters (fiber diameters) of the conductive inorganic fibers included in the bonding layer are measured. The measurement of the fiber diameters of the conductive inorganic fibers is performed by measuring 50 points of the fiber diameters of conductive inorganic fibers reflected in the sectional image at random. An average value of the measured fiber diameters is the average fiber diameter of the conductive inorganic fibers included in the bonding layer 7.

Here, the phrase of "the conductive inorganic fibers" means inorganic fibers where the fiber length of conductive inorganic fiber is five times or more to the above-mentioned fiber diameter of the conductive inorganic fiber. The fiber diameters and fiber lengths of the conductive inorganic fibers are values measured by the above-mentioned methods. It is to be noted that as to the conductive inorganic fibers, the fiber length of conductive inorganic fiber is preferably 10 times or more, and preferably from 20 to 500 times to the fiber diameter of the conductive inorganic fiber.

There is not any special restriction on the conductive inorganic fibers, as long as the fibers are made of β-SiC, but the conductive inorganic fibers are preferably the conductive inorganic fibers made of β-SiC where the carbon fibers are silicified. The conductive inorganic fibers where the carbon fibers are silicified are easily available. Furthermore, as compared with a case where the conductive inorganic fibers made of β-SiC are beforehand obtained and contained in the bonding material to form the bonding layer 7, it is possible to reduce the manufacturing costs of the bonding material in a case where the carbon fibers are contained in the bonding material and then the carbon fibers are silicified.

A volume ratio of a total volume of silicon and the metal silicide to a total volume of silicon, silicon carbide, the conductive inorganic fibers and the metal silicide included in the bonding layer 7 is preferably from 20 to 50 vol %. It is to be noted that the volume ratio of the total volume of silicon and the metal silicide is further preferably from 30 to 50 vol % and especially preferably from 40 to 50 vol %. When the volume ratio of the total volume of silicon and the metal silicide is within the above numeric range, the strength of the bonding layer 7 can be enhanced. Furthermore, the volume resistivity of the bonding layer 7 is adjusted easily into a desirable value by adjusting the resistivity of silicon carbide. For example, when the volume ratio of the total volume of silicon and the metal silicide is in excess of 50 vol %, the volume ratio of silicon carbide is relatively reduced, and a range capable of adjusting the volume resistivity of the bonding layer 7 becomes smaller sometimes. Furthermore, when the volume ratio of the total volume of silicon and the metal silicide is smaller than 20 vol %, the strength of the bonding layer 7 deteriorates sometimes.

A volume ratio of the metal silicide to the total volume of silicon, silicon carbide, the conductive inorganic fibers and the metal silicide included in the bonding layer 7 is preferably from 1 to 10 vol % and further preferably from 5 to 10 vol %. When the volume ratio of the metal silicide is within the above numeric range, the resistance rise ratio can be reduced and thermal shock resistance can be enhanced. For example, when the volume ratio of the metal silicide is in excess of 10 vol %, thermal expansion of the bonding layer 7 increases and the thermal shock resistance deteriorates sometimes. When the volume ratio of the metal silicide is smaller than 1 vol %, the resistance rise ratio increases sometimes.

A volume ratio of silicon carbide to the total volume of silicon, silicon carbide, the conductive inorganic fibers and the metal silicide included in the bonding layer 7 is preferably from 20 to 50 vol %, further preferably from 20 to 45 vol %, and especially preferably from 20 to 40 vol %. When the volume ratio of silicon carbide is within the above numeric range, the volume resistivity of the bonding layer 7 can be adjusted easily into the desirable value. It is to be noted that silicon carbide as the aggregate is preferably $\alpha$-SiC. The respective volume ratios of silicon, silicon carbide, the conductive inorganic fibers and the metal silicide can be measured by an XRD (X-ray diffraction method). For example, the volume ratios can be obtained by fitting the XRD pattern measured by the XRD (X-ray diffraction method) into a WPPD method. In the above X-ray diffraction, a graphite monochromator is used and X-ray diffraction analysis is performed by using a wavelength of a CuK$\alpha$ ray. A tube voltage is 50 kV and tube current is 300 mA. A continuous method is used, a measurement range is from 5 to 80°, a scanning speed is $2\theta=2°$ min$^{-1}$, and a receiving slit is 0.3 mm. It is to be noted that an example of a reference document where the WPPD method is described is the following Reference Document 1. Reference Document 1: Journal of the Ceramic Society of Japan, 107 [3], p249 to p257, (1999).

An average particle diameter of the particles of silicon carbide included in the bonding layer 7 is preferably from 10 to 60 µm, further preferably from 10 to 50 µm, and especially preferably from 15 to 45 µm. When the average particle diameter of the particles of silicon carbide is within the above numeric range, a suitable volume resistivity can be realized, and stress generated in the honeycomb segment bonded body 4 can effectively be relaxed by the bonding layer 7. When the average particle diameter of the particles of silicon carbide is in excess of 60 µm, since the particles of silicon carbide having comparatively large particle diameters are dotted in the bonding layer 7, the strength of the bonding layer 7 is reduced sometimes. When the average particle diameter of the particles of silicon carbide is smaller than 10 µm, for example, the strength of the bonding layer 7 is higher than strength of the honeycomb segments 6 sometimes. Therefore, the breaking-resistance property of the honeycomb segment bonded body 4 deteriorates sometimes. That is, since the bonding layer 7 also performs a function of a buffer member which relaxes the stress generated in the honeycomb segment bonded body 4, the breaking-resistance property of the honeycomb segment bonded body 4 is rather reduced when the strength of the bonding layer 7 is excessively large. Therefore, the bonding layer 7 preferably has strength capable of suitably relaxing the stress generated in the honeycomb segment bonded body 4 while effectively suppressing damages on the bonding layer 7 itself. Furthermore, when the average particle diameter of the particles of silicon carbide is smaller than 10 µm, the volume resistivity of the bonding layer 7 is high sometimes. The average particle diameter of the particles of silicon carbide can be measured by the following method. First, the bonding layer is photographed by the scanning type electron microscope (SEM). Next, the photographed sectional image is analyzed by the analysis software (Image-Pro (trade name) manufactured by Nihon Visual Science Co., Ltd.), and particle diameters of the particles of silicon carbide included in the bonding layer are measured. As to the particle diameters of the particles of silicon carbide, the particle diameters of 50 points of silicon carbide reflected in the sectional image are measured at random, and an average value of the measured particle diameters (maximum diameters) is obtained as the average particle diameter of the particles of silicon carbide included in the bonding layer 7. Furthermore, the average particle diameter of the particles of silicon carbide can be measured by a laser diffraction method, for example, in a state of the particles of silicon carbide for use as a raw material. That is, when the particles of silicon carbide for use as the raw material of the bonding layer 7 are available, the average particle diameter thereof can be also measured in a stage of the raw material. Furthermore, as to the average particle diameter of the respective particles included in the bonding layer, the above-mentioned measuring method by the image analysis of the sectional image photographed by the scanning type electron microscope (SEM) and the above-mentioned measuring method in the stage of the raw material can suitably be used together.

The bonding layer 7 may further include an oxide made of an alkaline earth metal oxide, $Al_2O_3$ and $SiO_2$. In this constitution, the strength of the bonding layer 7 enhances. The bonding layer 7 more preferably contains the alkaline earth metal oxide, $Al_2O_3$ and $SiO_2$ as oxide particles containing these three components. Examples of the above-mentioned alkaline earth metal oxide include MgO and SrO. Above all, the alkaline earth metal oxide is further preferably MgO. When the total volume of silicon, silicon carbide, the conductive inorganic fibers and the metal silicide included in the bonding layer 7 is 100 parts by volume, it is more preferable that 1 to 10 parts by volume of the above-mentioned oxide (i.e., the oxide made of the alkaline earth metal oxide, $Al_2O_3$ and $SiO_2$) is contained. In this constitution, the strength of the bonding layer 7 suitably enhances. When a content of the oxide is smaller than 1 part by volume, an effect obtained by adding this oxide is not sufficiently exhibited sometimes. Furthermore, when the content of the oxide is in excess of 10 parts by volume, the porosity of the bonding layer 7 is reduced and the thermal shock resistance of the bonding layer 7 deteriorates sometimes. A content ratio of the above oxide is especially preferably from 1 to 5 parts by volume. The above-mentioned content ratio of the oxide of the three components is a value obtained by observing the cross section of the bonding layer by the SEM to analyze the image by the image processing software. As the image processing software, Image Pro (manufactured by Nihon Visual Science Co., Ltd.) can be used. Specifically, for example, a sample for observing "the cross section" is first cut from the bonding layer. As to the cross section of the bonding layer, concaves and convexes in the cross section are filled with a resin, and polishing is further performed, to observe the polished surface. Then, from the observation results of five view fields of "the cross section" (a magnification of 500 times), a ratio of a total area of the alkaline earth metal oxide, $Al_2O_3$ and $SiO_2$ to a total area of silicon, silicon carbide, the conductive inorganic fibers and the metal silicide is calculated. When the above content ratio of the oxide of the three components can be obtained in the raw material to prepare the bonding layer, the ratio can be obtained in a stage of this raw material.

A porosity of the bonding layer 7 is preferably from 60 to 80%, further preferably from 65 to 80%, and especially preferably from 65 to 75%. When the porosity of the bonding layer is within the above numeric range, the stress generated in the honeycomb segment bonded body 4 can suitably be relaxed by the bonding layer 7. When the porosity of the bonding layer is in excess of 80%, the strength of the bonding layer 7 is reduced sometimes. When the porosity of the bonding layer is smaller than 60%, the thermal shock resistance of the bonding layer 7 deteriorates sometimes. The porosity of the bonding layer 7 can be measured by the following method. First, a portion where the bonding layer 7 is formed is buried in a resin. Next, in a cross section of the honeycomb structure 100 in a direction perpendicular to the extending direction of cell, the portion provided with the bonding layer 7 buried in the resin is photographed by the scanning type electron microscope (SEM). It is to be noted that in the photographing by the scanning type electron microscope, a view field of 0.5 mm×2.0 mm is photographed at a magnification of 200 times. Next, a photographed microscope picture is subjected to image analysis, to measure the porosity of the bonding layer 7. For example, the porosity of the bonding layer 7 can be measured as an area ratio between voids and particles in one view field of the above image by subjecting to binarizing processing.

The volume resistivity of the bonding layer 7 is preferably suitably set to a desirable value in accordance with the volume resistivities of the honeycomb segments 6, a bonding structure of the honeycomb segment bonded body 4, and the like. It is to be noted that as described above, the volume resistivity of the bonding layer 7 is from 2 to 2000 Ωcm. In the honeycomb structure 100 of the present embodiment, the volume resistivity of the bonding layer 7 is preferably from 2 to 2000 Ωcm, further preferably from 10 to 100 Ωcm, and especially preferably from 20 to 50 Ωcm. In the above numeric range, the volume resistivity of the bonding layer 7 is more preferably adjusted. Furthermore, when the bonding material to form the bonding layer 7 is prepared, two or more types of powder of silicon carbide where components of impurities included in silicon carbide are different or amounts of the impurities are different may be used as silicon carbide. When the above-mentioned two or more types of powder of silicon carbide are used, the volume resistivity of the bonding layer 7 can be adjusted while decreasing an influence on mechanical properties of the bonding layer 7 to be obtained. The volume resistivity of the bonding layer 7 is a value measured at room temperature by a two-terminal method.

A thickness of the bonding layer 7 is preferably from 0.1 to 5.0 mm, and further preferably from 0.3 to 1.0 mm. A width of the bonding layer 7 which bonds the honeycomb segments 6 to each other influences a resistance value of the bonding layer 7, and with the above width, it is possible to generate heat uniformly in the whole honeycomb segment bonded body 4. When the thickness is thinner than 0.1 mm, thermal shock resistance is reduced sometimes. When the thickness is thicker than 5.0 mm, the thermal shock resistance is reduced and a pressure loss during the flowing of an exhaust gas is excessively large sometimes.

When the volume resistivity of the bonding layer 7, the porosity of the bonding layer 7, the thickness of the bonding layer 7 and the like described hitherto are adjusted, the resistance value of the bonding layer 7 can be adjusted. The respective above-mentioned numeric ranges are preferably adjusted to set the resistance value of the bonding layer 7 to a desirable value.

Furthermore, the bonding layer 7 functions as a buffer member which relaxes heat stress of the honeycomb segment bonded body 4. Therefore, the bonding layer 7 preferably is not integrally sintered with sintered bodies of the honeycomb segments 6, but preferably bonds side surfaces of the plurality of sintered bodies of the honeycomb segments 6 to each other. According to this constitution, the honeycomb structure 100 having excellent thermal shock resistance can be obtained. For example, when the bonding layer 7 is integrally sintered with the honeycomb segments 6, in other words, when the integration is accomplished by diffusion bonding, the heat stress of the honeycomb segment bonded body 4 cannot sufficiently be relaxed by the bonding layer 7 sometimes.

As shown in FIG. 2, in the cross section perpendicular to the extending direction of the cells 2, the bonding layer 7 preferably has a both-ends contact linear portion 7A, and a resistance value between both end portions A and B in the both-ends contact linear portion 7A is preferably larger than a resistance value of the honeycomb segments 6. In portions constituting the bonding layer 7, the both-ends contact linear portion 7A is a linear portion "in which one end portion A comes in contact with the one electrode member 21 and another end portion B comes in contact with another electrode member 21". It is to be noted that when "the end portion of the bonding layer comes in contact with the electrode member", there is also included a case where an outer peripheral wall is interposed between the end portion of the bonding layer and the electrode member (a case where the end portion of the bonding layer comes in contact with the electrode member via the outer peripheral wall). The bonding layer 7 has such a structure, and hence when the voltage is applied between the pair of electrode members 21 and 21, it is possible to avoid a state where "a large amount of current flows from the one electrode member 21 to another electrode member 21 through the bonding layer 7 and current flowing through the honeycomb segments 6 decreases". That is, when the voltage is applied between the pair of electrode members 21 and 21, the current can sufficiently flow through the honeycomb segments 6. Furthermore, the current can evenly flow through the whole honeycomb structure 100, which makes it possible to generate heat uniformly in the whole honeycomb structure.

As shown in FIG. 2, in the cross section perpendicular to the extending direction of the cells 2, the bonding layer 7 preferably has a non-contact transverse linear portion 7B, and a resistance value between both end portions A and B in the non-contact transverse linear portion 7B is preferably smaller than a resistance value of the honeycomb segments 6. In the portions constituting the bonding layer 7, the non-contact transverse linear portion 7B is a linear portion "in which both the end portions A and B are positioned in an outer periphery of the honeycomb segment bonded body 4, do not come in contact with the electrode members 21 and intersect with a line segment connecting the centers of the pair of electrode members 21 and 21 to each other". The bonding layer 7 has such a structure, and hence when the voltage is applied between the pair of electrode members 21 and 21, it is possible to avoid a state where "when the current flows between the honeycomb segments 6 and 6, the flow of the current is disturbed by the bonding layer 7". That is, when the voltage is applied between the pair of electrode members 21 and 21, the current can sufficiently flow between the honeycomb segments 6 and 6, and it is possible to flow the current evenly through the whole honeycomb structure 100. Then, it is possible to generate heat uniformly in the whole honeycomb structure.

Figure 6:
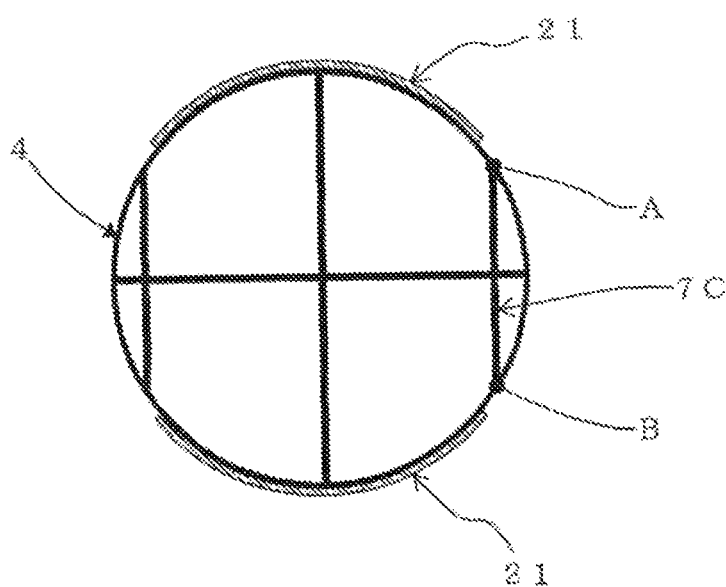
FIG. 6 is a schematic view showing a cross section perpendicular to an extending direction of cells in the other embodiment of the honeycomb structure of the present invention.

As shown in FIG. 6, in a cross section perpendicular to an extending direction of cells 2, a bonding layer 7 preferably has a non-contact vertical linear portion 7C, and a resistance value between both end portions A and B in the non-contact vertical linear portion 7C is preferably greater than a resistance value of each honeycomb segment 6. In portions constituting the bonding layer 7, the non-contact vertical linear portion 7C is a linear portion "in which both the end portions A and B are positioned in an outer periphery of a honeycomb segment bonded body 4, do not come in contact with electrode members 21 and do not intersect with a line segment connecting the centers of the pair of electrode members 21 and 21 to each other". The bonding layer 7 has such a structure, and hence when a voltage is applied between the pair of electrode members 21 and 21, it is possible to avoid a state where "current preferentially flows through the bonding layer 7 and current flowing through the honeycomb segments 6 decreases". That is, when the voltage is applied between the pair of electrode members 21 and 21, it is possible to flow sufficient current through the honeycomb segments 6, which makes it possible to generate heat uniformly in the whole honeycomb structure. Then, the current can evenly flow through the whole honeycomb structure 200. FIG. 6 is a schematic view showing the cross section perpendicular to the extending direction of the cells 2 in the other embodiment (the honeycomb structure 200) of the honeycomb structure of the present invention. In FIG. 6, partition walls and the cells are omitted.

Figure 7:
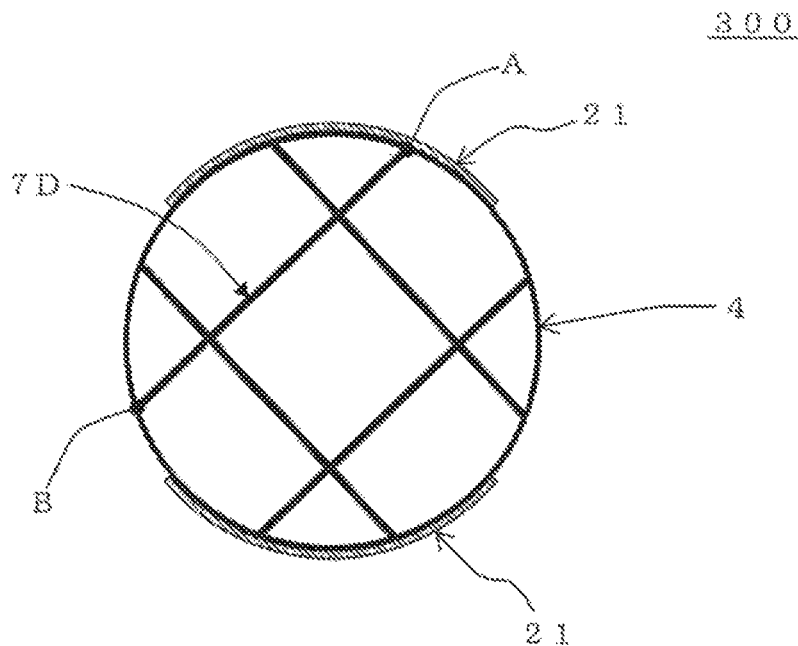
FIG. 7 is a schematic view showing a cross section perpendicular to an extending direction of cells in further the other embodiment of the honeycomb structure of the present invention.

As shown in FIG. 7, in a cross section perpendicular to an extending direction of cells 2, a bonding layer 7 preferably has a one-end contact linear portion 7D, and a resistance value between both end portions A and B in the one-end contact linear portion 7D is preferably larger than a resistance value of each honeycomb segment 6. In portions constituting the bonding layer 7, the one-end contact linear portion 7D is a linear portion "in which both the end portions A and B are positioned in an outer periphery of a honeycomb segment bonded body 4 and the one end portion A only comes in contact with an electrode member 21". The bonding layer 7 has such a structure, and hence when a voltage is applied between a pair of electrode members 21 and 21, it is possible to avoid a state where "a large amount of current flows from the one electrode member 21 to another electrode member 21 through the bonding layer 7 and current flowing through the honeycomb segments 6 decreases". That is, when the voltage is applied between the pair of electrode members 21 and 21, it is possible to flow sufficient current through the honeycomb segments 6. Then, it is possible to flow the current evenly in the whole honeycomb structure 300, which makes it possible to generate heat uniformly in the whole honeycomb structure. FIG. 7 is a schematic view showing the cross section perpendicular to the extending direction of the cell in still the other embodiment (the honeycomb structure 300) of the honeycomb structure of the present invention. In FIG. 7, partition walls and the cells are omitted.

Figure 8:
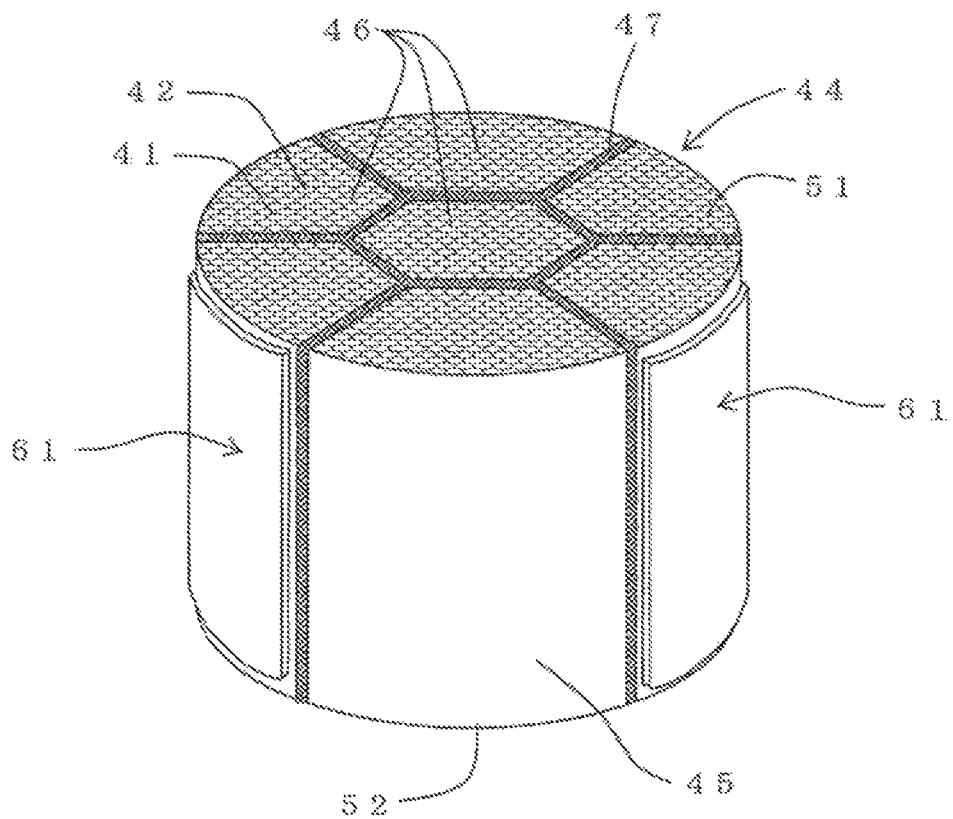
FIG. 8 is a perspective view schematically showing further the other embodiment of the honeycomb structure of the present invention.
Figure 9:
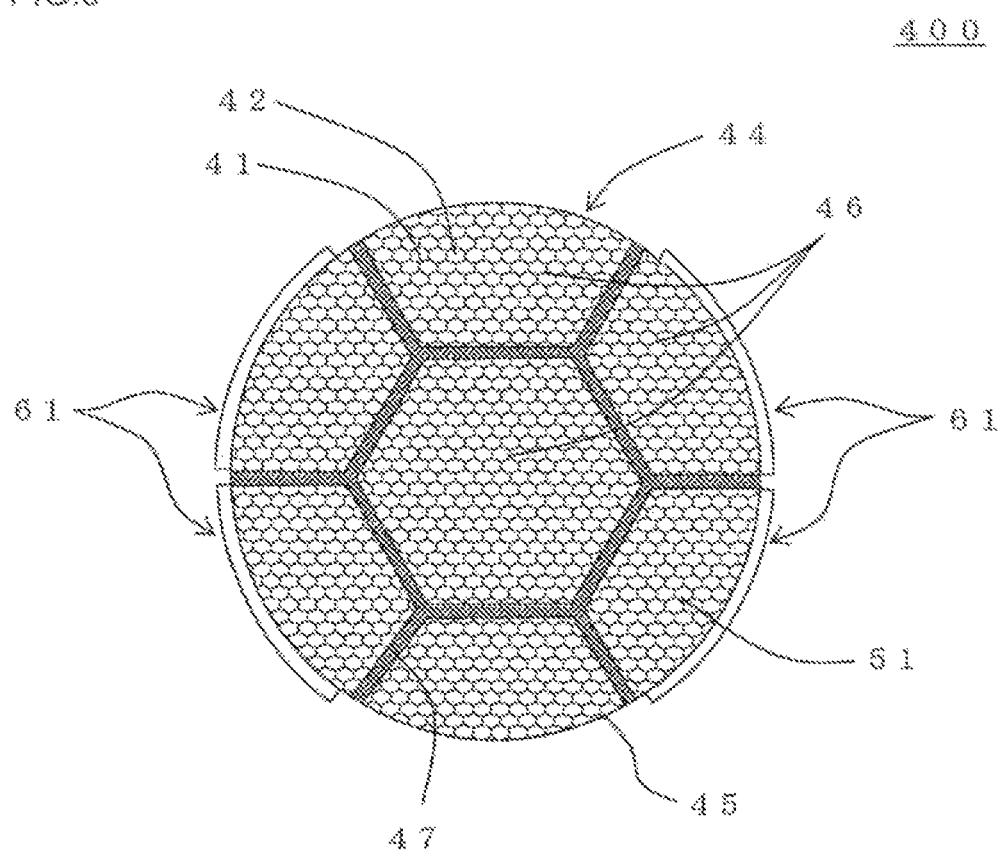
FIG. 9 is a plan view showing a first end face of the honeycomb structure shown in FIG. 8.

There is not any special restriction on a shape of the honeycomb segment, and as long as the side surfaces of the plurality of honeycomb segments can be bonded to each other by the bonding layer, the honeycomb segments may have any shape. Specifically, a shape of the cross section vertical to the extending direction of the cell is preferably a polygonal (quadrangular, pentangular, hexagonal, heptagonal, octagonal or the like) columnar shape. For example, a honeycomb structure 400 shown in FIG. 8 and FIG. 9 is an example of a case where a shape of each of cells 42 in a cross section perpendicular to an extending direction of the cells 42 is a hexagonal shape and a shape of a cross section of one honeycomb segment 46 being vertical to an extending direction of cell is a hexagonal shape. Here, FIG. 8 is a perspective view schematically showing still the other embodiment of the honeycomb structure of the present invention. FIG. 9 is a plan view showing a first end face of the honeycomb structure shown in FIG. 8.

The honeycomb structure 400 shown in FIG. 8 and FIG. 9 includes a tubular honeycomb segment bonded body 44, and a pair of electrode members 61 and 61 disposed on a side surface 45 of the honeycomb segment bonded body 44. The honeycomb segment bonded body 44 has a plurality of columnar honeycomb segments 46, and a bonding layer 47 which bonds side surfaces of the plurality of honeycomb segments 46 to each other. The honeycomb segments 46 have porous partition walls 41 defining the plurality of cells 42 as through channels of a fluid which extend from a first end face 51 to a second end face 52. It is to be noted that as shown in FIG. 9, in the honeycomb structure 400, two electrode members 61 on the right side of paper surface and two electrode members 61 on the left side of the paper surface via the center of the honeycomb segment 46 constitute the pair of electrode members 61 and 61. That is, as to the two electrode members 61 on the right side of the paper surface, the electrode member 61 is divided into two electrode members by a portion where the bonding layer 47 is disposed, but the two electrode members 61 on the right side of the paper surface are electrically connected to power sources of the same polarity. Similarly, as to the two electrode members 61 on the left side of the paper surface, the electrode member 61 is divided into two electrode members by a portion where the bonding layer 47 is disposed, but the two electrode members are electrically connected to power sources of the same polarity (the polarity different from the polarity to be connected to the two electrode members 61 on the right side of the paper surface). Therefore, in the present invention, the electrode members 61 on the right side of the paper surface and the electrode members 61 on the left side of the paper surface constitute the pair of electrode members 61 and 61.

In the honeycomb segment bonded body, a plurality of honeycomb segments prepared individually may be bonded by a bonding material. Furthermore, the honeycomb segment bonded body may be manufactured, for example, by the following method. First, there is prepared a tubular honeycomb formed body having partition walls defining a plurality of cells as through channels of a fluid which extend from a first end face to a second end face, and an outer peripheral wall positioned in the outermost periphery. A shape of a cross section of this honeycomb formed body in an extending direction of cell is the same shape as that of the honeycomb segment bonded body of the honeycomb structure being a manufacturing object (i.e., the honeycomb segment bonded body in which the plurality of honeycomb segments are bonded by the bonding layer). Next, the obtained honeycomb formed body is dried to obtain a honeycomb dried body. Next, an electrode member forming raw material is applied to each of a first region and a second region of a side surface of the obtained honeycomb dried body, and the applied electrode member forming raw material is dried and fired, to obtain a honeycomb fired body with electrodes. Thus obtained honeycomb fired body with the electrodes has the same sectional shape as in the honeycomb structure being the manufacturing object, but the plurality of honeycomb segments are not bonded together, and a pair of electrode members are disposed on an integrated honeycomb fired body. Next, in a state where a connection margin is left in a part of a first end face side or a second end face side of the obtained honeycomb fired body with the electrodes, a cut dividing portion for dividing the honeycomb fired body with the electrodes into a plurality of bodies is formed in the extending direction of cell of the honeycomb fired body with the electrodes to obtain a partially divided honeycomb fired body. That is, the above cut dividing portion is formed to divide a portion other than the connection margin of the honeycomb fired body with the electrodes. Next, a bonding material is filled into the cut dividing portion of the obtained partially divided honeycomb fired body, and the partially divided honeycomb fired body into which the bonding material is filled is dried and fired. Next, an end face of the partially divided honeycomb fired body in which the connection margin is formed is cut and processed, to prepare the honeycomb structure being the manufacturing object. That is, by the above-mentioned cut processing of the connection margin, each portion of the partially divided honeycomb fired body having a part divided by the cut dividing portion is divided in a state where the portions are already bonded together by the bonding material. The individually divided portions of the partially divided honeycomb fired body are tubular honeycomb segments, respectively. Such a honeycomb segment bonded body is remarkably simply prepared.

The honeycomb segment bonded body 4 of the honeycomb structure 100 of the present embodiment may have an outer peripheral wall 3 in the outermost periphery of the bonded body where the plurality of honeycomb segments 6 are bonded together by the bonding layer 7. The outer peripheral wall 3 may be disposed to surround an outer peripheral portion of the bonded body where the plurality of honeycomb segments 6 are bonded together by the bonding layer 7. Furthermore, the side surface of the honeycomb segment disposed in the outermost periphery may constitute the outer peripheral wall 3 of the honeycomb segment bonded body 4. For example, the outer peripheral portion of the honeycomb segment bonded body 4 may be constituted of the outer peripheral wall 3 constituted by the side surfaces of the honeycomb segments 6, and the end portions of the bonding layer 7 which bonds the side surfaces of the adjacent honeycomb segments 6 to each other. It is to be noted that the honeycomb structure of the present invention may or may not have the outer peripheral wall.

A material of the outer peripheral wall 3 is preferably made of a silicon-silicon carbide composite material or a silicon carbide material as a main component, and is further preferably the silicon-silicon carbide composite material or the silicon carbide material. By the use of such a material, the volume resistivity of the outer peripheral wall 3 can be set to a value equivalent to the volume resistivity of each of the honeycomb segments 6.

As shown in FIG. 1 to FIG. 5, in the honeycomb structure 100 of the present embodiment, the pair of electrode members 21 and 21 are disposed on the side surface 5 of the honeycomb segment bonded body 4 (i.e., the surface of the outer peripheral wall 3). The honeycomb structure 100 of the present embodiment generates the heat by applying the voltage between the pair of electrode members 21 and 21. The voltage to be applied is preferably from 12 to 900 V, and further preferably from 64 to 600 V.

As shown in FIG. 1 to FIG. 5, in the honeycomb structure 100 of the present embodiment, each of the above pair of electrode members 21 and 21 is formed into the band shape extending in the extending direction of the cells 2 of the honeycomb segment bonded body 4. Then, in the cross section perpendicular to the extending direction of the cells 2, the one electrode member 21 in the pair of electrode members 21 and 21 is disposed on the opposite side across the center O of the honeycomb segment bonded body 4 with respect to another electrode member 21 in the pair of electrode members 21 and 21. In the honeycomb structure 100 of the present embodiment, further, in the cross section perpendicular to the extending direction of the cells 2, an angle of 0.5 times a central angle $\alpha$ of each of the electrode members 21 and 21 (an angle $\theta$ of 0.5 times the central angle $\alpha$) is preferably from 15 to 65° and further preferably from 30 to 60°. According to this constitution of the electrode member, it is possible to more effectively suppress a deviation of the current flowing in the honeycomb segment bonded body 4, when the voltage is applied between the pair of electrode members 21 and 21. That is, the current flowing in the honeycomb segment bonded body 4 can flow more evenly. In consequence, it is possible to suppress the deviation of the heat generation in the honeycomb segment bonded body 4. As shown in FIG. 5, "the central angle $\alpha$ of the electrode member 21" is an angle formed by two line segments connecting both ends of the electrode member 21 to the center O of the honeycomb segment bonded body 4, in the cross section perpendicular to the extending direction of the cells 2. That is, in the cross section perpendicular to the extending direction of the cells 2, the central angle is an inner angle of a portion of the center O, in a shape (e.g., a fan shape) formed by "the electrode member 21", "the line segment connecting one end portion of the electrode member 21 to the center O", and "the line segment connecting the another end portion of the electrode member 21 to the center O".

Furthermore, "the angle $\theta$ of 0.5 times the central angle $\alpha$" of the one electrode member 21 preferably has a size of 0.8 to 1.2 times and further preferably has a size of 1.0 time (i.e., the same size) to "the angle $\theta$ of 0.5 times the central angle $\alpha$" of another electrode member 21. Consequently, when the voltage is applied between the pair of electrode members 21 and 21, it is possible to more effectively suppress the deviation of the current flowing in the honeycomb segment bonded body 4, and hence it is possible to more effectively suppress the deviation of the heat generation in the honeycomb segment bonded body 4.

In the honeycomb structure of the present embodiment, for example, as shown in FIG. 1 to FIG. 5, the electrode member 21 has a shape obtained by bending a planar rectangular member along an outer periphery of a cylindrical shape. Here, when the bent electrode member 21 is deformed so that the section becomes a planar member which is not bent, the shape of the section will be referred to as "a planar shape" of the electrode member 21. As described above, "the planar shape"

of the electrode member 21 shown in FIG. 1 to FIG. 5 is a rectangular shape. Furthermore, "an outer peripheral shape of the electrode member" means "the outer peripheral shape in the planar shape of the electrode member".

In the honeycomb structure of the present embodiment, as shown in FIG. 1 to FIG. 5, the outer peripheral shape of the band-like electrode member 21 may be the rectangular shape, but the outer peripheral shape of the band-like electrode member 21 is "a shape in which corner portions of the rectangular shape are curvedly formed" in another preferable configuration. Furthermore, the outer peripheral shape of the band-like electrode member 21 is "a shape in which the corner portions of the rectangular shape are linearly chamfered" in still another preferable configuration. A composite application of "a curved form" and "a linear form" (a rectangular shape in which at least one of the corner portions has "a curvedly formed shape" and at least one of the corner portions has "a linearly chamfered shape") is also preferable.

As described above, when the outer peripheral shape of the electrode member 21 is "the shape in which the corner portions of the rectangular shape are curvedly formed" or "the shape in which the corner portions of the rectangular shape are linearly chamfered", the thermal shock resistance of the honeycomb structure can be further enhanced. When the corner portions of the electrode member have right angles, stress in the vicinity of "each corner portion of the electrode member" in the honeycomb segment bonded body tends to be relatively high as compared with the other portions. In contrast, when the corner portion of the electrode member is curvedly or linearly chamfered, it is possible to decrease the stress in the vicinity of "the corner portion of the electrode member" in the honeycomb segment bonded body.

Furthermore, in the honeycomb structure of the present embodiment, the electrode member preferably does not have "the corner portion in which "the inner angle is smaller than 90°"". When the electrode member has "the corner portion in which "the inner angle is smaller than 90°"", high stress is easily applied to the honeycomb segment bonded body at the vicinity of "the corner portion in which "the inner angle is smaller than 90°"" in the electrode member at the time of applying the heat shock to the honeycomb structure.

In the honeycomb structure of the present embodiment, a thickness of the pair of electrode members is preferably from 0.025 to 1.0 mm, further preferably from 0.025 to 0.7 mm, and especially preferably from 0.05 to 0.5 mm. By reducing the thickness of the electrode member in this manner, a heat capacity of the electrode member can be lowered, and the thermal shock resistance of the honeycomb structure can be enhanced. When the thickness of the electrode member is thinner than 0.025 mm, it is difficult sometimes to flow the current evenly to the honeycomb segment bonded body. When the thickness of the electrode member is thicker than 1.0 mm, it is difficult sometimes to lower the heat capacity of the electrode member. The thickness of the electrode member is a value measured by an optical microscope.

In a case where the honeycomb structure of the present embodiment has the outer peripheral wall, a thickness of the outer peripheral wall is preferably from 0.1 to 1.0 mm, further preferably from 0.2 to 0.8 mm, and especially preferably from 0.2 to 0.5 mm. When the thickness of the outer peripheral wall is within such a range, the thermal shock resistance of the honeycomb structure can be enhanced. Furthermore, when the honeycomb structure is used as the catalyst carrier and a catalyst is loaded thereonto, the pressure loss during the flowing of the exhaust gas can be prevented from being excessively large. When the thickness of the outer peripheral wall of the honeycomb segment bonded body is thinner than 0.1 mm, the strength of the honeycomb structure is reduced sometimes. When the thickness of the outer peripheral wall of the honeycomb segment bonded body is thicker than 1.0 mm, the thermal shock resistance of the honeycomb structure deteriorates sometimes. Furthermore, when the thickness of the outer peripheral wall of the honeycomb segment bonded body is thicker than 1.0 mm, an area of each partition wall onto which the catalyst is loaded is small sometimes, in the case where the honeycomb structure is used as the catalyst carrier and the catalyst is loaded thereonto. The thickness of the outer peripheral wall is a value measured by the optical microscope.

In the honeycomb structure of the present embodiment, a porosity of the pair of electrode members is preferably from 30 to 80%, further preferably from 30 to 70%, and especially preferably from 30 to 60%. When the porosity of the electrode member is within such a range, the heat capacity of the electrode member can be lowered, and the thermal shock resistance of the honeycomb structure can be enhanced. When the porosity of the electrode member is smaller than 30%, it is difficult sometimes to lower the heat capacity of the electrode member. When the porosity of the electrode member is larger than 80%, it is difficult sometimes to flow the current evenly to the honeycomb segment bonded body. When the porosity of the electrode member is larger than 80%, the volume resistivity of the electrode member is excessively high sometimes.

In the case where the honeycomb structure of the present embodiment has the outer peripheral wall, a porosity of the outer peripheral wall of the honeycomb segment bonded body is preferably from 35 to 60%, further preferably from 35 to 55%, and especially preferably from 35 to 50%. When the porosity of the outer peripheral wall of the honeycomb segment bonded body is within such a range, the thermal shock resistance of the honeycomb structure can be enhanced. When the porosity of the outer peripheral wall of the honeycomb segment bonded body is smaller than 35%, an effect of enhancing the thermal shock resistance of the honeycomb structure deteriorates sometimes. When the porosity of the outer peripheral wall of the honeycomb segment bonded body is larger than 60%, mechanical strength of the honeycomb structure is reduced sometimes. The porosity is a value measured by a mercury porosimeter.

In the honeycomb structure of the present embodiment, a volume resistivity of the electrode member 21 is preferably from 0.1 to 100 Ωm, and further preferably from 0.1 to 50 Ωm. When the volume resistivity of the electrode member 21 is within such a range, the pair of electrode members 21 and 21 effectively performs functions of electrodes in a pipe through which the high-temperature exhaust gas flows. When the volume resistivity of the electrode member 21 is smaller than 0.1 Ωm, a temperature of the honeycomb segment bonded body in the vicinity of both ends of the electrode member 21 easily rises sometimes in the cross section perpendicular to an extending direction of cell. When the volume resistivity of the electrode member 21 is larger than 100 Ωcm, the current is hard to flow, and hence the electrode member does not easily perform the function as the electrode. The volume resistivity of the electrode member is a value measured by a four-terminals method. The volume resistivity of the electrode member is a value at 400° C.

The electrode member 21 preferably contains silicon carbide particles and silicon as main components, and is further preferably formed by using the silicon carbide particles and silicon as raw materials, except the usually contained impurities. Here, "containing the silicon carbide particles and silicon as the main components" means that a total mass of the silicon carbide particles and silicon is 90 mass % or more of a mass of the whole electrode member. When the electrode member 21 contains the silicon carbide particles and silicon as the main components in this manner, the components of the electrode member 21 and the components of the honeycomb segment bonded body 4 are the same components or close components (in a case where a material of each portion constituting the honeycomb segment bonded body is silicon carbide). Therefore, thermal expansion coefficients of the electrode member 21 and the honeycomb segment bonded body 4 are the same value or values close to each other. Furthermore, the material of the electrode member 21 is the same as in the honeycomb segment bonded body 4 or close to the material of the honeycomb segment bonded body, and hence a bonding strength between the electrode member 21 and the honeycomb segment bonded body 4 is also high. Therefore, even when the heat stress is applied to the honeycomb structure, the electrode member 21 can be prevented from being peeled from the honeycomb segment bonded body 4, or a bonding portion between the electrode member 21 and the honeycomb segment bonded body 4 can be prevented from being damaged.

An average pore diameter of the electrode member 21 is preferably from 5 to 45 μm, and further preferably from 7 to 40 μm. When the average pore diameter of the electrode member 21 is within such a range, a suitable volume resistivity can be obtained. When the average pore diameter of the electrode member 21 is smaller than 5 μm, the volume resistivity is excessively high sometimes. When the average pore diameter of the electrode member 21 is larger than 45 μm, the strength of the electrode member 21 weakens and the electrode member is easily damaged sometimes. The average pore diameter is a value measured by the mercury porosimeter.

When the main components of the electrode member 21 are silicon carbide particles and silicon, an average particle diameter of the silicon carbide particles contained in the electrode member 21 is preferably from 10 to 70 μm, and further preferably from 10 to 60 μm. When the average particle diameter of the silicon carbide particles contained in the electrode member 21 is within such a range, the volume resistivity of the electrode member 21 can be adjusted in a range of 0.1 to 100 Ωm. When the average particle diameter of the silicon carbide particles contained in the electrode member 21 is smaller than 10 μm, the volume resistivity of the electrode member 21 is excessively large sometimes. When the average particle diameter of the silicon carbide particles contained in the electrode member 21 is larger than 70 μm, the strength of the electrode member 21 weakens and the electrode member is easily damaged sometimes. The average particle diameter of the silicon carbide particles contained in the electrode member 21 is a value measured by the laser diffraction method.

A ratio of a mass of silicon contained in the electrode member 21 to "a total of respective masses of the silicon carbide particles and silicon" contained in the electrode member 21 is preferably from 20 to 50 mass %, and further preferably from 20 to 40 mass %. When the ratio of the mass of silicon to the total of the respective masses of the silicon carbide particles and silicon contained in the electrode member 21 is within such a range, the volume resistivity of the electrode member 21 can be adjusted in a range of 0.1 to 100 Ωm. When the ratio of the mass of silicon to the total of the respective masses of the silicon carbide particles and silicon contained in the electrode member 21 is smaller than 20 mass %, the volume resistivity is excessively large sometimes, and when the ratio is larger than 50 mass %, the electrode member is easily deformed sometimes during the manufacturing.

In the honeycomb structure 100 of the present embodiment, a thickness of the partition walls of the respective honeycomb segments 6 (hereinafter, also referred to as "the partition wall thickness") is from 50 to 260 μm, and preferably from 70 to 180 μm. When the partition wall thickness is within such a range, the pressure loss during the flowing of the exhaust gas can be prevented from being excessively large, even in the case where the honeycomb structure 100 is used as the catalyst carrier and the catalyst is loaded thereonto. When the partition wall thickness is thinner than 50 μm, the strength of the honeycomb structure is reduced sometimes. When the partition wall thickness is thicker than 260 μm, the pressure loss during the flowing of the exhaust gas is large sometimes, in the case where the honeycomb structure 100 is used as the catalyst carrier and the catalyst is loaded thereonto.

In the honeycomb structure 100 of the present embodiment, a cell density of the respective honeycomb segments 6 is preferably from 40 to 150 cells/cm$^2$, and further preferably from 70 to 100 cells/cm$^2$. When the cell density is within such a range, a purification performance of the catalyst can be enhanced in a state where the pressure loss during the flowing of the exhaust gas is small. When the cell density is lower than 40 cells/cm$^2$, a catalyst loading area is reduced sometimes. When the cell density is higher than 150 cells/cm$^2$, the pressure loss during the flowing of the exhaust gas is large sometimes, in the case where the honeycomb structure 100 is used as the catalyst carrier and the catalyst is loaded thereonto.

In the honeycomb structure 100 of the present embodiment, an average particle diameter of the silicon carbide particles (the aggregate) constituting the respective honeycomb segments 6 is preferably from 3 to 50 μm, and further preferably from 3 to 40 μm. When the average particle diameter of the silicon carbide particles constituting the respective honeycomb segments 6 is within such a range, the volume resistivities of the respective honeycomb segments 6 at 400° C. can be from 1 to 200 Ωm. When the average particle diameter of the silicon carbide particles is smaller than 3 μm, the volume resistivities of the honeycomb segments 6 are large sometimes. When the average particle diameter of the silicon carbide particles is larger than 50 μm, the volume resistivities of the honeycomb segments 6 are small sometimes. Furthermore, when the average particle diameter of the silicon carbide particles is larger than 50 μm, a die for extrusion is clogged with a forming raw material sometimes, during the extrusion of a formed body of each honeycomb segment. The average particle diameter of the silicon carbide particles is a value measured by the laser diffraction method.

In the honeycomb structure 100 of the present embodiment, the volume resistivities of the respective honeycomb segments 6 is from 1 to 200 Ωcm, preferably from 10 to 150 Ωcm, and further preferably from 15 to 70 Ωm. When the volume resistivity is smaller than 1 Ωcm, the current excessively flows sometimes, for example, at the time of energizing the honeycomb structure 100 by a power source of a high voltage of 200 V or more. When the volume resistivity is larger than 200 Ωcm, the current is hard to flow and the heat is not sufficiently generated sometimes, for example, at the time of energizing the honeycomb structure 100 by the power source of the high voltage of 200 V or more.

In the honeycomb structure 100 of the present embodiment, when a material of the honeycomb segments 6 is the silicon-silicon carbide composite material, a relation between a content of silicon and a content of silicon carbide is preferably as follows. First, "a mass of the silicon carbide particles as the aggregate" contained in the honeycomb segments 6 is "a segment aggregate mass" and "a mass of silicon as the binding material" contained in the honeycomb segments 6 is "a segment silicon mass". At this time, a ratio of "the segment silicon mass" to a total of "the segment aggregate mass" and "the segment silicon mass" is preferably from 10 to 40 mass %, and further preferably from 15 to 35 mass %. When the ratio is lower than 10 mass %, the strength of the honeycomb structure is reduced sometimes. When the ratio is higher than 40 mass %, the shape cannot be held sometimes during the firing.

A porosity of the partition walls 1 of the honeycomb segments 6 is preferably from 35 to 60%, and further preferably from 45 to 55%. When the porosity is smaller than 35%, the deformation during the firing is large sometimes. When the porosity is in excess of 60%, the strength of the honeycomb structure is reduced sometimes. The porosity is a value measured by the mercury porosimeter.

An average pore diameter of the partition walls 1 of the honeycomb segments 6 is preferably from 2 to 15 µm, and further preferably from 4 to 8 µm. When the average pore diameter is smaller than 2 µm, the volume resistivity is excessively large sometimes. When the average pore diameter is larger than 15 µm, the volume resistivity is excessively small sometimes. The average pore diameter is a value measured by the mercury porosimeter.

In the respective honeycomb segments 6, a shape of the cells 2 in the cross section perpendicular to the extending direction of the cells 2 is preferably a quadrangular shape, a hexagonal shape, an octagonal shape, or any combination of these shapes. With such a cell shape, the pressure loss during the flowing of the exhaust gas through the honeycomb structure 100 is small, and the purification performance of the catalyst is excellent.

There is not any special restriction on a shape of the honeycomb segments, and the shape may be any shape as long as the side surfaces of the plurality of honeycomb segments can be bonded to each other by the bonding layer. Specifically, a shape of the cross section vertical to the extending direction of cell is preferably a polygonal (quadrangular, pentangular, hexagonal, heptangular, octagonal or another) tubular shape. Furthermore, as to the shape of the honeycomb segments, the shape of one honeycomb segment may be different from the shape of the other honeycomb segment. For example, when the shape of the cross section of the honeycomb segment bonded body is a round shape, the shape of the respective honeycomb segments may be the following shape. First, the shape of the cross section of the honeycomb segment disposed at a position of the honeycomb segment bonded body including the center of the above cross section is the hexagonal shape. Here, the honeycomb segment where the shape of the above-mentioned cross section is the hexagonal shape is "the hexagonal honeycomb segment". Furthermore, the shape of the cross section of the other honeycomb segment is a shape surrounded with a normal drawn from each vertex of the hexagonal honeycomb segment to the outer periphery of the honeycomb segment bonded body, and the outer periphery of the honeycomb segment bonded body. Furthermore, the honeycomb segments do not have any specific wall surfaces constituting the side surfaces of the honeycomb segments (i.e., the wall surfaces other than the partition walls), and part of the partition walls defining the cells may constitute the side surfaces of the honeycomb segments.

There is not any special restriction on a shape of the honeycomb segment bonded body 4, and examples of the shape include a tubular shape with a round bottom surface (a cylindrical shape), a tubular shape with an oval bottom surface (an elliptic tubular shape), and a tubular shape (a columnar shape) with a bottom surface having a polygonal shape (a quadrangular shape, a pentangular shape, a hexagonal shape, a heptagonal shape, an octagonal shape, or the like). Moreover, as to a size of the honeycomb structure, an area of the bottom surface is preferably from 2000 to 20000 mm², and further preferably from 4000 to 10000 mm². Furthermore, a length of the honeycomb structure (in other words, the honeycomb segment bonded body) in a central axis direction (the cell extending direction) is preferably from 50 to 200 mm and further preferably from 75 to 150 mm.

An isostatic strength of the honeycomb structure 100 of the present embodiment is preferably 1 MPa or more, and further preferably 3 MPa or more. The larger value of the isostatic strength is more preferable, but when a material, a structure and the like of the honeycomb structure 100 are taken into consideration, an upper limit of the isostatic strength is about 6 MPa. When the isostatic strength is smaller than 1 MPa, the honeycomb structure is easily damaged sometimes during the use of the honeycomb structure as the catalyst carrier or the like. The isostatic strength is a value measured under a hydrostatic pressure in water.

The honeycomb structure of the present invention can be used as the catalyst carrier, and the honeycomb structure of the present invention can be used as a catalyst for an exhaust gas treatment by loading a known catalyst thereonto by a known method.

(2) Manufacturing Method of Honeycomb Structure:

Next, one embodiment of a manufacturing method of the honeycomb structure of the present invention will be described. The manufacturing method of the honeycomb structure of the present embodiment is a method of manufacturing the hitherto described honeycomb structure of the present invention. That is, the manufacturing method of the honeycomb structure of the present embodiment is a method of manufacturing the honeycomb structure including the honeycomb segment bonded body, and the pair of electrode members disposed on the side surface of this honeycomb segment bonded body. It is to be noted that the honeycomb segment bonded body has the plurality of tubular honeycomb segments having the porous partition walls defining the plurality of cells as the through channels of the fluid which extend from the first end face to the second end face, and the bonding layer which bonds the side surfaces of the plurality of honeycomb segments to each other. In the manufacturing method of the honeycomb structure of the present embodiment, the bonding layer is prepared so that in the bonding layer, the conductive inorganic fibers made of β-SiC and the metal silicide are included in the porous body where the particles of silicon carbide are bound with silicon as the binding material. An example of the manufacturing method is a manufacturing method in which, for example, as the bonding material to form the bonding layer, there is used a material including silicon carbide (silicon carbide powder), silicon (silicon powder), carbon fibers, and powder made of at least one of the following metal and the following metal compound. An example of the above metal is a metal of at least one selected from the group consisting of nickel and zirconium. An example of the above metal compound is a metal compound including a metal element of the at least one selected from the group consisting of nickel and zirconium. Examples of the powder made of at least one of the metal and the metal compound include nickel powder and zirconium powder. The carbon fibers included in this bonding material are silicified to form conductive inorganic fibers made of β-SiC in the bonding layer. Furthermore, by the nickel powder, the zirconium powder or the like, a metal silicide such as nickel silicide or zirconium silicide is formed in the bonding layer. According to this manufacturing method, the honeycomb structure of the present invention can simply and inexpensively be manufactured. The metal compound including the metal element of the at least one selected from the group consisting of nickel and zirconium is preferably at least one of a metal oxide and the metal silicide.

It is to be noted that the method of manufacturing the honeycomb structure of the present invention is not limited to the above-mentioned manufacturing method. For example, the bonding layer may beforehand include silicon carbide (the silicon carbide powder), silicon (the silicon powder), the conductive inorganic fibers made of β-SiC, and the metal silicide. That is, the bonding material to form the bonding layer may be any material, as long as the material is prepared so that when the material is applied to the side surface of each honeycomb segment, the conductive inorganic fibers made of β-SiC and the metal silicide are included in the bonding layer obtained through steps of the drying, the firing and the like.

Hereinafter, the manufacturing method of the honeycomb structure of the present embodiment will be described in more detail. It is to be noted that in the manufacturing method of the honeycomb structure of the present embodiment, a preparing method of the honeycomb segments and a preparing method of the electrode members are not limited to the following methods. For example, the honeycomb segments and the electrode members can suitably be changed in conformity to a heretofore known honeycomb structure manufacturing method.

First, silicon powder (silicon), a binder, a surfactant, a pore former, water and the like are added to silicon carbide powder (silicon carbide), to prepare a forming raw material for the honeycomb segments. A mass of silicon to a total of a mass of the silicon carbide powder and the mass of silicon is preferably from 10 to 40 mass %. An average particle diameter of silicon carbide particles in the silicon carbide powder is preferably from 3 to 50 μm, and further preferably from 3 to 40 μm. An average particle diameter of silicon (the silicon powder) is preferably from 1 to 35 μm. The average particle diameters of the silicon carbide particles and silicon particles are values measured by the laser diffraction method. The silicon carbide particles are fine particles of silicon carbide constituting the silicon carbide powder, and the silicon particles are fine particles of silicon constituting the silicon powder. It is to be noted that this is a blend of the forming raw material in a case where a material of the honeycomb segments is a silicon-silicon carbide composite material, and silicon is not added in a case where the material of the honeycomb sections is silicon carbide.

Examples of the binder include methylcellulose, hydroxypropyl methylcellulose, hydroxypropoxyl cellulose, hydroxyethylcellulose, carboxymethylcellulose, and polyvinyl alcohol. Among these binders, methylcellulose and hydroxypropoxyl cellulose are preferably used together. A content of the binder is preferably from 2.0 to 10.0 parts by mass, when the total mass of the silicon carbide powder and the silicon powder is 100 parts by mass.

A content of the water is preferably from 20 to 60 parts by mass, when the total mass of the silicon carbide powder and the silicon powder is 100 parts by mass.

As the surfactant, ethylene glycol, dextrin, fatty acid soap, polyalcohol, polyoxyethylene alkyl ether, polyoxyethylene phenyl ether or the like can be used. One of these surfactants may be used alone or any combination of two or more of the surfactants may be used. A content of the surfactant is preferably from 0.1 to 2.0 parts by mass, when the total mass of the silicon carbide powder and the silicon powder is 100 parts by mass.

As long as the pore former forms pore after the firing, there is not any special restriction on the pore former, and examples of the pore former include graphite, starch, resin balloons, a water-absorbing resin, and silica gel. A content of the pore former is preferably from 0.5 to 10.0 parts by mass, when the total mass of the silicon carbide powder and the silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, a die is clogged with the pore former sometimes during formation. The average particle diameter of the pore former is a value measured by the laser diffraction method.

Next, the forming raw material is kneaded to form a kneaded material. There is not any special restriction on a method of kneading the forming raw material to form the kneaded material, and an example of the method is a method using a kneader, a vacuum clay kneader or the like.

Next, the formed body of the honeycomb segment is formed by the extruding the kneaded material. During the extrusion, a die having a desirable whole shape, cell shape, partition wall thickness, cell density and the like is preferably used. As a material of the die, a hard metal being hard to wear down is preferable. The formed body of the honeycomb segment has a columnar structure having partition walls defining a plurality of cells as through channels of a fluid. The plurality of formed bodies of the honeycomb segments are formed in accordance with the number of the segments constituting a bonded body. Each formed body of the honeycomb segment may have an outer wall on the side surface thereof.

A partition wall thickness, a cell density, an outer wall thickness and the like of the formed body of the honeycomb segment can suitably be determined in accordance with a structure of the honeycomb segment to be prepared, in consideration of shrinkage during the drying and the firing.

The obtained formed body of the honeycomb segment is preferably dried. There is not any special restriction on a drying method, and examples of the drying method include electromagnetic heating methods such as microwave heating drying and high frequency dielectric heating drying, and external hearing methods such as hot air drying and superheat steam drying. Among these methods, it is preferable that a predetermined amount of water content is dried by the electromagnetic heating method, and then the remaining water content is dried by the external heating method, because the whole formed body can rapidly and evenly be dried so that cracks are not generated. As drying conditions, 30 to 99 mass % of the water content is preferably removed from an amount of the water content prior to the drying by the electromagnetic heating method, and then the water content is preferably decreased to 3 mass % or less by the external heating method. As the electromagnetic heating method, the dielectric heating drying is preferable, and as the external heating method, the hot air drying is preferable.

When a length of the formed body of the honeycomb segment in a central axis direction is not a desirable length, both end faces (both end portions) are preferably cut to obtain the desirable length. There is not any special restriction on a cutting method, but an example of the method is a method using a round saw cutter or the like.

Next, the formed bodies of the honeycomb segments are preferably dried. Drying conditions at this time are preferably from 50 to 200° C.

Next, each dried formed body of the honeycomb segment is preferably calcinated to remove the binder and the like. The calcinating is preferably performed at 400 to 500° C. for 0.5 to 20 hours under the air atmosphere.

Next, the calcinated formed body of the honeycomb segment is preferably fired. As firing conditions, the heating is preferably performed at 1400 to 1500° C. for one to 20 hours under an inert atmosphere such as argon. Furthermore, after the firing, an oxygenation treatment is preferably performed at 1200 to 1350° C. for one to ten hours for enhancement of durability. There is not any special restriction on calcinating, firing and oxygenation treatment methods, and an electric furnace, a gas furnace or the like can be used.

A plurality of fired honeycomb segments are preferably prepared by the above method.

Next, the bonding material to form the bonding layer which bonds the honeycomb segments together is prepared. When the honeycomb structure of the present embodiment is manufactured, as the bonding material, there is used a material including silicon carbide, silicon, the carbon fibers, and nickel or zirconium. It is to be noted that as described above, nickel and zirconium can be used as metal compounds including these metal elements. In the following manufacturing method, an example of the manufacturing method where nickel powder or zirconium powder is used will be described.

The bonding material is preferably formed by adding predetermined additives to silicon carbide powder, silicon powder, the inorganic fibers made of the oxide, and nickel powder or zirconium powder, followed by the kneading. To the bonding material, an oxide made of an alkaline earth metal oxide, $Al_2O_3$ and $SiO_2$ may further be added. Specifically, the silicon powder (silicon), the carbon fibers, the nickel powder (or the zirconium powder), a binder, a moisture retaining agent, a surfactant, a pore former, water and the like are added to the silicon carbide powder (silicon carbide), followed by the kneading, to prepare the bonding material. The nickel powder and the zirconium powder may be used together. Amounts of the silicon carbide powder and the silicon powder are preferably adjusted to satisfy a volume ratio of each component in the example of the preferable range which has been mentioned in the description of the bonding layer of the honeycomb structure of the present embodiment. The carbon fibers are silicified, whereby the fibers exist in the bonding layer as the conductive inorganic fibers made of β-SiC. An amount of the carbon fibers is preferably from 3 to 25 vol %, and further preferably from 8 to 20 vol to a total volume of the silicon carbide powder, the silicon powder, the carbon fibers and the nickel powder.

An average particle diameter of silicon carbide particles in the silicon carbide powder is preferably from 10 to 60 μl, and further preferably from 10 to 50 μm. An average particle diameter of silicon particles in the silicon powder is preferably from 2 to 20 μm. Average particle diameters of nickel particles in the nickel powder and zirconium particles in the zirconium powder are preferably from 0.1 to 50 μm. The average particle diameters of the silicon carbide particles, the silicon particles, the nickel particles and the zirconium particles are values measured by the laser diffraction method. The silicon particles preferably contain impurities, and a content of silicon is preferably from 90.0 to 99.9 at % (an atomic percentage). Examples of the impurities include Fe, Al, Ca, B, and P.

An average fiber length of the carbon fibers is preferably 0.3 mm or more, further preferably from 0.3 to 5 mm, and especially preferably from 1 to 5 mm. Furthermore, an average fiber diameter of the carbon fibers is preferably from 2 to 20 μm, and further preferably from 5 to 15 μm. Furthermore, the carbon fibers are preferably fibers made of carbon at a mass ratio of 90% or more.

As the binder, a material similar to the forming raw material of the honeycomb segment can be used. A content of the binder is preferably from 0.1 to 5.0 parts by mass, when a total mass of the silicon carbide powder, the silicon powder, the carbon fibers and the nickel powder (or the zirconium powder) is 100 parts by mass.

An example of the moisture retaining agent is glycerin. A content of the moisture retaining agent is preferably from 1 to 10 parts by mass, when the total mass of the silicon carbide powder, the silicon powder, the carbon fibers and the nickel powder (or the zirconium powder) is 100 parts by mass.

A content of the water is preferably from 20 to 80 parts by mass, when the total mass of the silicon carbide powder, the silicon powder, the carbon fibers and the nickel powder (or the zirconium powder) is 100 parts by mass.

The surfactant and the pore former similar to those in the forming raw material of the honeycomb segment can also be used. A content of the surfactant is preferably from 0.1 to 10 parts by mass, when the total mass of the silicon carbide powder, the silicon powder, the carbon fibers and the nickel powder (or the zirconium powder) is 100 parts by mass. A content of the pore former is preferably from 1 to 20 parts by mass, when the total mass of the silicon carbide powder and the silicon powder is 100 parts by mass.

Furthermore, as described above, the oxide made of the alkaline earth metal oxide, $Al_2O_3$ and $SiO_2$ may further be added to the bonding material. An example of such an oxide is cordierite powder. A content of the oxide powder is preferably from 1 to 10 parts by volume, when a total volume of the silicon powder, the silicon carbide powder, the carbon fibers and the nickel powder (or the zirconium powder) is 100 parts by volume.

As the bonding material, the above-mentioned materials are preferably mixed and prepared in a paste.

Next, the plurality of honeycomb segments are bonded into a predetermined shape together while bonding the side surfaces of the honeycomb segments to each other by the bonding material, to prepare the bonded body of the honeycomb segments.

The bonded body of the honeycomb segments is preferably dried after the bonded body of the honeycomb segments is prepared. Drying conditions at this time are preferably from 50 to 200° C.

Next, the dried bonded body of the honeycomb segments is preferably calcinated to remove the binder and the like in the bonding material. The calcinating is preferably performed at 400 to 500° C. for 0.5 to 20 hours under the air atmosphere.

Next, the calcinated bonded body of the honeycomb segments is preferably fired to obtain the bonded body. By this firing, the plurality of honeycomb segments are firmly bonded together by the bonding layer. As firing conditions, the heating is preferably performed at 1400 to 1500° C. for one to 20 hours under the inert atmosphere such as argon. Moreover, after the firing, the oxygenation treatment is preferably performed at 1200 to 1350° C. for one to ten hours for the enhancement of the durability. There is not any special restriction on the calcinating, firing and oxygenation treatment methods, and the electric furnace, the gas furnace or the like can be used. In the manufacturing method of the honeycomb structure of the present embodiment, the bonding material includes silicon, the carbon fibers and the nickel powder (or the zirconium powder), and hence during the above firing, the carbon fibers are silicified to form the conductive inorganic fibers made of β-SiC. Furthermore, the nickel powder and the zirconium powder become metal silicides. Such a bonding layer is hard to break against the stress, and further, the electrical resistance value of the portion bonded by the bonding layer does not easily rise at the time of applying the stress thereto. That is, the electrical resistance value of the portion bonded by the bonding layer is hard to rise at the time of applying stress such as the bending stress. Therefore, when the electrode members are disposed in such a honeycomb segment bonded body to manufacture the honeycomb structure, the current flows suitably through the whole honeycomb segment bonded body via the bonding layer, so that it is possible to generate heat uniformly to the honeycomb segment bonded body. Moreover, the carbon fibers are silicified to form the conductive inorganic fibers made of β-SiC, and hence the manufacturing costs can be reduced as compared with a case where the conductive inorganic fibers made of β-SiC are beforehand contained in the bonding material.

It is to be noted that the formed bodies of the honeycomb segments are dried, the formed bodies of the honeycomb segments may be bonded together by using the bonding material, and then the formed bodies of the honeycomb segments and the bonding material may be fired. In this case, the electrode member forming raw material is applied, and then the firing is performed again, so that the number of firing times is two in total (two firing times). Furthermore, the formed bodies of the honeycomb segments are dried, the formed bodies of the honeycomb segments are bonded together by using the bonding material, the formed bodies of the honeycomb segments and the bonding material are dried, and then the electrode member forming raw material may be applied prior to the firing. In this case, the electrode member forming raw material is applied, and then the first firing is performed, so that the number of the firing times is one in total (one firing time).

Next, an outer peripheral portion of the obtained bonded body may be ground and processed into a predetermined shape. Furthermore, when the outer peripheral wall is formed, an outer periphery coating material may be applied to the outer peripheral surface of the obtained bonded body or the bonded body subjected to the grind processing, to prepare a precursor of the outer peripheral wall.

The outer periphery coating material is preferably prepared by the following method. When main components of the outer periphery coating material are silicon carbide and silicon, predetermined additives are preferably added to the silicon carbide powder and the silicon powder, followed by the kneading, to prepare the paste-like outer periphery coating material.

Further specifically, the silicon powder (silicon), a binder, a surfactant, a pore former, water and the like are preferably added to the silicon carbide powder (silicon carbide), followed by the kneading, to prepare the outer periphery coating material. A mass of silicon is preferably from 20 to 50 parts by mass, when the total mass of the silicon carbide powder and silicon is 100 parts by mass. An average particle diameter of the silicon carbide particles in the silicon carbide powder is preferably from 3 to 70 µm. An average particle diameter of the silicon powder (silicon) is preferably from 2 to 20 µm. When the average particle diameter is smaller than 2 µm, the volume resistivity is excessively small sometimes. When the average particle diameter is larger than 20 µm, the volume resistivity is excessively large sometimes. The average particle diameters of the silicon carbide particles and silicon particles are values measured by the laser diffraction method. The silicon carbide particles are fine particles of silicon carbide constituting the silicon carbide powder, and the silicon particles are fine particles of silicon constituting the silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these binders, methylcellulose and hydroxypropoxyl cellulose are preferably used together. A content of the binder is preferably from 0.1 to 5.0 parts by mass, when the total mass of the silicon carbide powder and the silicon powder is 100 parts by mass.

A content of the water is preferably from 15 to 60 parts by mass, when the total mass of the silicon carbide powder and the silicon powder is 100 parts by mass.

As the surfactant, ethylene glycol, dextrin, fatty acid soap, polyalcohol or the like can be used. One of these surfactants may be used alone or any combination of two or more of the surfactants may be used. A content of the surfactant is preferably from 0.1 to 2.0 parts by mass, when the total mass of the silicon carbide powder and the silicon powder is 100 parts by mass.

As long as the pore former forms the pore after the firing, there is not any special restriction on the pore former, and examples of the pore former include graphite, starch, resin balloons, a water-absorbing resin, and silica gel. A content of the pore former is preferably from 0.1 to 15.0 parts by mass, when the total mass of the silicon carbide powder and the silicon powder is 100 parts by mass. An average particle diameter of the pore former is preferably from 10 to 30 µm.

Next, the outer periphery coating material prepared by the above method is preferably applied to the outer peripheral surface of the bonded body or the bonded body subjected to the grind processing. There is not any special restriction on an applying method, and the material can be applied, for example, by a spatula.

Next, the electrode member forming raw material to form the electrode members is prepared. When main components of the electrode members are silicon carbide and silicon, the electrode member forming raw material is preferably prepared by adding predetermined additives to the silicon carbide powder and the silicon powder, followed by the kneading.

Specifically, the silicon powder (silicon), a binder, a moisture retaining agent, a surfactant, a pore former, water and the like are preferably added to the silicon carbide powder (silicon carbide), followed by the kneading, to prepare the electrode member forming raw material. A mass of the silicon powder is preferably from 10 to 50 parts by mass, when the total mass of the silicon carbide powder and the silicon powder is 100 parts by mass. An average particle diameter of the silicon carbide particles in the silicon carbide powder is preferably from 10 to 70 µm. An average particle diameter of the silicon powder (silicon) is preferably from 1 to 20 µm. When the average particle diameter is smaller than 1 µm, the volume resistivity is excessively small sometimes. When the average particle diameter is larger than 20 µm, the volume resistivity is excessively large sometimes. The average particle diameters of the silicon carbide particles and silicon particles are values measured by the laser diffraction method. The silicon carbide particles are fine particles of silicon carbide constituting the silicon carbide powder, and the silicon particles are fine particles of silicon constituting the silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these binders, methylcellulose and hydroxypropoxyl cellulose are preferably used together. A content of the binder is preferably from 0.1 to 5.0 parts by mass, when the total mass of the silicon carbide powder and the silicon powder is 100 parts by mass.

An example of the moisture retaining agent is glycerin. A content of the moisture retaining agent is preferably from 1 to 10 parts by mass, when the total mass of the silicon carbide powder and the silicon powder is 100 parts by mass.

A content of the water is preferably from 15 to 60 parts by mass, when the total mass of the silicon carbide powder and the silicon powder is 100 parts by mass.

As the surfactant, ethylene glycol, dextrin, fatty acid soap, polyalcohol or the like can be used. One of these surfactants may be used alone or any combination of two or more of the surfactants may be used. A content of the surfactant is preferably from 0.1 to 2.0 parts by mass, when the total mass of the silicon carbide powder and the silicon powder is 100 parts by mass.

As long as the pore former forms the pore after the firing, there is not any special restriction on the pore former, and examples of the pore former include graphite, starch, resin balloons, a water-absorbing resin, and silica gel. A content of the pore former is preferably from 0.1 to 10 parts by mass, when the total mass of the silicon carbide powder and the silicon powder is 100 parts by mass. An average particle diameter of the pore former is preferably from 5 to 50 μm. When the average particle diameter is smaller than 5 μm, the pores sufficiently cannot be formed sometimes. When the average particle diameter is larger than 50 μm, large pores are easily formed, and strength reduction is occurred sometimes. The average particle diameter of the pore former is a value measured by the laser diffraction method.

Next, a mixture obtained by mixing the silicon carbide powder (silicon carbide), the silicon powder (silicon), a binder, a moisture retaining agent, a surfactant, a pore former, water and the like is preferably kneaded to obtain a paste-like electrode member forming raw material. There is not any special restriction on a kneading method and, for example, a vertical stirrer can be used.

Next, the obtained electrode member forming raw material is preferably applied to the surface of the precursor of the outer peripheral wall of the bonded body (the one obtained by drying applied outer periphery coating material). There is not any special restriction on a method of applying the electrode member forming raw material to the surface of the precursor of the outer peripheral wall but, for example, a printing method can be used. Furthermore, the electrode member forming raw material is preferably applied to the side surface of the bonded body so as to obtain the shape and arrangement of the electrode members in the above honeycomb structure of the present invention.

Furthermore, a shape of an applied film is preferably determined so that the outer peripheral shape of the electrode member to be formed is a desirable shape, when the electrode member forming raw material is applied to the surface of the precursor of the outer peripheral wall (in other words, the side surface of the bonded body). For example, the applied film is formed into a shape where at least one corner portion of a rectangular shape is curvedly formed or a shape where at least one corner portion of the rectangular shape is linearly chamfered in a preferable configuration.

A thickness of the electrode member can be a desirable thickness by adjusting a thickness of the electrode member forming raw material during the application thereof. The electrode member can be formed only by applying the electrode member forming raw material to the surface of the precursor of the outer peripheral wall, followed by the drying and the firing in this manner, and hence the electrode member can very easily be formed.

Next, the electrode member forming raw material applied to the surface of the precursor of the outer peripheral wall of the bonded body is preferably dried. In consequence, the dried "bonded body of the honeycomb segments to which the electrode member forming raw material is applied" can be obtained. Drying conditions are preferably from 50 to 200° C.

Then, the dried "bonded body of the honeycomb segments to which the electrode member forming raw material is applied" is preferably fired to obtain the honeycomb structure of the present invention.

Furthermore, prior to the firing, the calcinating is preferably performed to remove the binder and the like. The calcinating is preferably performed at 400 to 500° C. for 0.5 to 20 hours under the air atmosphere. There is not any special restriction on calcinating and firing methods, and the firing can be performed by using the electric furnace, the gas furnace or the like. As the firing conditions, the heating is preferably performed at 1400 to 1500° C. for one to 20 hours under the inert atmosphere such as argon. Furthermore, after the firing, the oxygenation treatment is preferably performed at 1200 to 1350° C. for one to ten hours for the enhancement of the durability.

As described above, the manufacturing method of the honeycomb structure of the present embodiment may be, for example, the following manufacturing method, as long as there is used the material containing silicon carbide, silicon, the carbon fibers, and nickel or zirconium as the bonding material.

First, there is prepared a tubular honeycomb formed body having partition walls defining a plurality of cells as through channels of a fluid which extend from a first end face to a second end face, and an outer peripheral wall positioned in the outermost periphery. The honeycomb formed body can be obtained by kneading a forming raw material constituted similarly to the forming raw material for the honeycomb segments to form a kneaded material and extruding this kneaded material. In this case, a shape of a cross section of the honeycomb formed body in an extending direction of cell is the same shape as in a honeycomb segment bonded body of a honeycomb structure being a manufacturing object (i.e., the honeycomb segment bonded body where the plurality of honeycomb segments are bonded by a bonding layer).

Next, the obtained honeycomb formed body is dried to obtain a honeycomb dried body. Also as to a drying method, the drying can be performed by a method similar to the above-mentioned method of drying the formed bodies of the honeycomb segments. Next, an electrode member forming raw material is applied to each of a first region and a second region of a side surface of the obtained honeycomb dried body, and the applied electrode member forming raw material is dried and fired, to obtain a honeycomb fired body with electrodes. The first region and the second region of the side surface of the above-mentioned honeycomb dried body are preferably regions where a pair of electrode members is disposed on a side surface of the honeycomb segment bonded body in the honeycomb structure to be manufactured. The electrode member forming raw material to form the electrode members can be prepared by a method similar to the method of preparing the electrode member forming raw material in the above-mentioned manufacturing method of the honeycomb structure. Thus obtained honeycomb fired body with electrodes has the same sectional shape as in the honeycomb structure being the manufacturing object, but the plurality of honeycomb segments are not bonded together and the pair of electrode members are disposed on the integrated honeycomb fired body.

Next, in a state where a connection margin is left in a part of a first end face side or a second end face side of the obtained honeycomb fired body with the electrodes, a cut dividing portion for dividing the honeycomb fired body with the electrodes into a plurality of bodies is formed in the extending direction of cell of the honeycomb fired body with the electrodes to obtain a partially divided honeycomb fired body.

That is, the above cut dividing portion is formed to divide a portion other than the connection margin of the honeycomb fired body with the electrodes. The cut dividing portion is a portion where the bonding layer is disposed in the honeycomb segment bonded body of the honeycomb structure being the manufacturing object.

Next, a paste-like bonding material is filled into the cut dividing portion of the obtained partially divided honeycomb fired body. In this case, there is used the material containing silicon carbide, silicon, the carbon fibers, and nickel or zirconium as the bonding material. The bonding material can be prepared by a method similar to the method of preparing the bonding material in the above-mentioned manufacturing method of the honeycomb structure.

Next, the partially divided honeycomb fired body into which the bonding material is filled is dried and fired. Next, an end face of the partially divided honeycomb fired body subjected to the firing in which the connection margin is formed is cut and processed, to prepare the honeycomb structure being the manufacturing object. That is, by the above-mentioned cut processing of the connection margin, each portion of the partially divided honeycomb fired body having a part divided by the cut dividing portion is divided in a state where the portions are already bonded together by the bonding material. The individually divided portions of the partially divided honeycomb fired body are tubular honeycomb segments, respectively. According to this manufacturing method, by the above-mentioned cut processing of the connection margin, the desirable honeycomb segment bonded body can remarkably simply be manufactured.

Furthermore, as described above, the method of manufacturing the honeycomb structure of the present invention is not limited to the above-mentioned manufacturing method. For example, the conductive inorganic fibers made of β-SiC may beforehand be contained in the bonding material or the metal silicide may beforehand be contained in the bonding material.

EXAMPLES

Hereinafter, the present invention will further specifically be described with respect to examples, but the present invention is not limited to these examples.

Example 1

First, there was prepared a honeycomb forming raw material to prepare portions of honeycomb segments of a honeycomb segment bonded body. The honeycomb forming raw material was prepared by kneading 6 kg of silicon powder of 14 kg of silicon carbide powder of 30 μm, 1 kg of cordierite powder of 4 μm, 1.6 kg of methylcellulose, and 8 kg of water by a kneader.

Next, the obtained honeycomb forming raw material was kneaded in vacuum to obtain a kneaded material, and the obtained kneaded material was extruded into a honeycomb form, to obtain a honeycomb formed body. Next, the obtained honeycomb formed body was dried at 120° C. to obtain a honeycomb dried body.

Next, an electrode member forming raw material to form electrode members was prepared. The electrode member forming raw material was prepared by kneading silicon powder having an average particle diameter of 5 μm, silicon carbide powder having an average particle diameter of 50 μm, cordierite powder having an average particle diameter of 2 μm, methylcellulose, a polyacrylic dispersant, glycerin, and water. 35 g of the silicon powder, 65 g of the silicon carbide powder, 5 g of the cordierite powder, 0.5 g of methylcellulose, 0.1 g of the polyacrylic dispersant, 10 g of glycerin, and 40 g of the water were used.

Next, the obtained electrode member forming raw material was applied to the side surface of the honeycomb dried body, and dried at 80° C., to obtain the honeycomb dried body with an electrode forming raw material. The honeycomb dried body with the electrode forming raw material was degreased and fired, to prepare a honeycomb fired body with electrodes. The degreasing was performed at 450° C. for five hours under the atmospheric air. The firing was performed at 1450° C. for two hours under an argon atmosphere.

In a state where a connection margin was left in an end portion on one end face side of the obtained honeycomb fired body with the electrodes, a cut dividing portion to divide the honeycomb fired body with the electrodes into a plurality of bodies was formed in an extending direction of cell of the honeycomb fired body with the electrodes, to obtain a partially divided honeycomb fired body.

Next, silicon powder, silicon carbide powder, nickel powder, carbon fibers, resin powder, methylcellulose, glycerin, polyoxyethylene phenyl ether and water were kneaded by a mixer, to prepare a paste-like bonding material. As the silicon powder, 262 g of silicon powder having an average particle diameter of 5 μm and a density of 2.33 g/cm³ was used. As the silicon carbide powder, 116 g of silicon carbide powder having an average particle diameter of 43 μm and a density of 3.17 g/cm³ was used. As the nickel powder, 26 g of nickel powder having an average particle diameter of 1 μm was used. As the carbon fibers, 49 g of carbon fibers having an average fiber diameter of 12 μm and an average fiber length of 3 mm were used. As the resin powder, 30 g of resin powder having an average particle diameter of 100 μm and a density of 0.02 g/cm³ was used. Furthermore, the used amount of methylcellulose was 2.5 g, the used amount of glycerin was 50 g, the used amount of polyoxyethylene phenyl ether was 5 g, and the used amount of the water was 250 g. Additionally, in all the examples and comparative examples, as the silicon carbide powder used in the preparation of the bonding material, powder made of particles of silicon carbide of α-SiC was used.

The obtained bonding material was pressed into the cut dividing portion of the partially divided honeycomb fired body, and the partially divided honeycomb fired body into which the bonding material was pressed was dried, degreased, fired, and subjected to an oxygenation treatment. The drying was performed at 80° C. The degreasing was performed at 400° C. under the atmospheric air. The firing was performed at 1450° C. under the argon atmosphere. The oxygenation treatment was performed at 1200° C. under the atmospheric air. Through the above drying, degreasing, firing and oxygenation treatment, a bonding layer was formed by the bonding material. In this bonding layer, conductive inorganic fibers made of β-SiC and nickel silicide ($NiSi_2$) as a metal silicide were included in a porous body where the silicon carbide particles as an aggregate were bound with silicon as a binding material in a state where pores were held among the particles.

Next, the end portion on one side in which the connection margin was formed in the partially divided honeycomb fired body was removed by subjecting to end face processing. In this way, there was prepared a honeycomb structure including a tubular honeycomb segment bonded body and a pair of electrode members disposed on the side surface of this honeycomb segment bonded body. In this way, in Example 1, the connection margin of the partially divided honeycomb fired body was removed, whereby it was possible to obtain the honeycomb segment bonded body in a state where a plurality of tubular honeycomb segments were already bonded by the bonding layer. The honeycomb structure of Example 1 was constituted similarly to, for example, the honeycomb structure 400 of FIG. 8 and FIG. 9.

In the bonding layer, as described above, the carbon fibers were silicified, whereby the conductive inorganic fibers made of β-SiC were formed. A density of this conductive inorganic fibers made of β-SiC was 3.17 g/cm³. Hereinafter, the conductive inorganic fibers made of β-SiC formed by silicifying the carbon fibers will be referred to as "the conductive inorganic fibers" or simply as "the inorganic fibers" sometimes. Moreover, the bonding layer contained nickel silicide as the metal silicide. A density of nickel silicide was 4.83 g/cm³. Furthermore, an average fiber diameter of the inorganic fibers (i.e., the conductive inorganic fibers) was 12 μm and an average fiber length thereof was 3 mm.

In each honeycomb segment, a thickness of partition walls was 101.6 μm and a cell density was 93 cells/cm². Furthermore, a diameter of each end face of the honeycomb segment bonded body was 100 mm and a length in the extending direction of cell was 100 mm.

Here, in Table 1, a constitution of the bonding material used in Example 1 is shown. That is, in an "amount (vol %)" column of silicon of Table 1, there is shown a ratio of a volume (vol %) of silicon in a total volume of silicon, a metal silicide, silicon carbide particles and inorganic fibers. Furthermore, in a "type" column of the metal silicide of Table 1, components of the metal silicide are shown. In an "amount (vol %)" column of the metal silicide of Table 1, there is shown a ratio of a volume (vol %) of the metal silicide in the total volume of silicon, the metal silicide, the silicon carbide particles and the inorganic fibers. Furthermore, in an "amount (vol %)" column of the silicon carbide particles of Table 1, there is shown a ratio of a volume (vol %) of the silicon carbide particles in the total volume of silicon, the metal silicide, the silicon carbide particles and the inorganic fibers. In a "particle diameter (μm)" column of the silicon carbide particles of Table 1, an average particle diameter of the silicon carbide particles is shown. Furthermore, in a "type" column of the inorganic fibers of Table 1, components of the inorganic fibers are shown. When the type of inorganic fibers is "β-SiC", it can be said that the inorganic fibers are the conductive inorganic fibers. In a "fiber amount (vol %)" column of the inorganic fibers of Table 1, there is shown a ratio of a volume (vol %) of the inorganic fibers in the total volume of silicon, the metal silicide, the silicon carbide particles and the inorganic fibers. Furthermore, in Table 2, a type of inorganic fibers, a fiber length (μm), a fiber diameter (μm) and a fiber amount (vol %) are shown. As a result of quantitative analysis of the bonding layer of the honeycomb structure of each of examples and comparative examples by an XRD (X-ray diffraction method), the same results as in the above-mentioned amounts of silicon, the metal silicide, silicon carbide and the inorganic fibers were obtained. The quantitative analysis by the XRD of the bonding layer was carried out by fitting the XRD pattern measured by the XRD (X-ray diffraction method) into a WPPD method.

"The fiber length (μm)" of Table 2 is an average fiber length of the inorganic fibers and "the fiber diameter (μm)" is an average fiber diameter of the inorganic fibers. A measuring method of the average fiber length (μm) of the inorganic fibers is as follows. First, the bonding layer is photographed by a scanning type electron microscope (SEM). A photographed image by the scanning type electron microscope is obtained by photographing a view field of 0.5 mm×20 mm at a magnification of 200 times. Next, the photographed sectional image is analyzed by analysis software (Image-Pro (trade name) manufactured by Nihon Visual Science Co., Ltd.), and lengths (fiber lengths) of the inorganic fibers included in the bonding layer are measured. The measurement of the fiber lengths of the inorganic fibers is performed by measuring 50 points for fiber lengths of inorganic fibers reflected in the sectional image at random, and an average value of the measured fiber lengths is obtained as the average fiber length of the inorganic fibers included in the bonding layer. Furthermore, a measuring method of the average fiber diameter (μm) of the inorganic fibers is as follows. First, the bonding layer is photographed by the scanning type electron microscope (SEM). Next, the photographed sectional image is analyzed by the analysis software (Image-Pro (trade name) manufactured by Nihon Visual Science Co., Ltd.) and diameters (fiber diameters) of the inorganic fibers included in the bonding layer are measured. The measurement of the fiber diameters of the inorganic fibers is performed by measuring 50 points for fiber diameters of inorganic fibers reflected in the sectional image at random, and an average value of the measured fiber diameters is obtained as the average fiber diameter of the inorganic fibers included in the bonding layer.

TABLE 1

|  | Silicon | Metal silicide | | Silicon carbide particles | | Inorganic fibers | | Non-fibrous oxide | |
| --- | --- | --- | --- | --- | --- | --- | --- | --- | --- |
|  | Amount (vol %) | Type | Amount (vol %) | Amount (vol %) | Particle dia. (μm) | Type | Fiber amount (vol %) | Type | Amount (parts by volume) |
| Example 1 | 36 | NiSi$_2$ | 7 | 24 | 43 | β-SiC | 33 | — |  |
| Example 2 | 38 | NiSi$_2$ | 7 | 16 | 43 | β-SiC | 39 | — |  |
| Example 3 | 36 | NiSi$_2$ | 7 | 34 | 43 | β-SiC | 23 | — |  |
| Example 4 | 36 | NiSi$_2$ | 7 | 39 | 43 | β-SiC | 18 | — |  |
| Example 5 | 35 | NiSi$_2$ | 7 | 48 | 43 | β-SiC | 10 | — |  |
| Example 6 | 37 | NiSi$_2$ | 7 | 24 | 43 | β-SiC | 32 | — |  |
| Example 7 | 37 | NiSi$_2$ | 7 | 24 | 43 | β-SiC | 32 | — |  |
| Example 8 | 37 | NiSi$_2$ | 7 | 24 | 43 | β-SiC | 32 | — |  |
| Example 9 | 38 | NiSi$_2$ | 7 | 24 | 43 | β-SiC | 31 | — |  |
| Example 10 | 11 | NiSi$_2$ | 7 | 50 | 43 | β-SiC | 32 | — |  |
| Example 11 | 14 | NiSi$_2$ | 7 | 48 | 43 | β-SiC | 33 | — |  |
| Example 12 | 25 | NiSi$_2$ | 7 | 35 | 43 | β-SiC | 33 | — |  |
| Example 13 | 49 | NiSi$_2$ | 7 | 11 | 43 | β-SiC | 33 | — |  |
| Example 14 | 39 | NiSi$_2$ | 2 | 29 | 43 | β-SiC | 29 | — |  |
| Example 15 | 25 | NiSi$_2$ | 13 | 29 | 43 | β-SiC | 33 | — |  |
| Example 16 | 43 | ZrSi$_2$ | 7 | 24 | 43 | β-SiC | 26 | — |  |
| Example 17 | 25 | NiSi$_2$ | 7 | 35 | 56 | β-SiC | 33 | — |  |
| Example 18 | 25 | NiSi$_2$ | 7 | 35 | 83 | β-SiC | 33 | — |  |

TABLE 1-continued

| | Silicon Amount (vol %) | Metal silicide Type | Metal silicide Amount (vol %) | Silicon carbide particles Amount (vol %) | Silicon carbide particles Particle dia. (μm) | Inorganic fibers Type | Inorganic fibers Fiber amount (vol %) | Non-fibrous oxide Type | Non-fibrous oxide Amount (parts by volume) |
|---|---|---|---|---|---|---|---|---|---|
| Example 19 | 37 | NiSi₂ | 7 | 24 | 12 | β-SiC | 32 | — | |
| Example 20 | 15 | NiSi₂ | 7 | 46 | 43 | β-SiC | 32 | MgO—Al₂O₃—SiO₂ | 5 |
| Example 21 | 16 | NiSi₂ | 7 | 46 | 43 | β-SiC | 31 | MgO—Al₂O₃—SiO₂ | 10 |
| Example 22 | 38 | NiSi₂ | 7 | 24 | 43 | β-SiC | 33 | — | |
| Comparative Example 1 | 40 | — | | 60 | 43 | — | | MgO—Al₂O₃—SiO₂ | 5 |
| Comparative Example 2 | 50 | — | | 40 | 43 | Alumina/mullite | 10 | MgO—Al₂O₃—SiO₂ | 2 |
| Comparative Example 3 | 50 | — | | 46 | 43 | β-SiC | 4 | — | |

TABLE 2

| | Inorganic fibers Type | Fiber length (mm) | Fiber dia. (μm) | Fiber amount (vol %) |
|---|---|---|---|---|
| Example 1 | β-SiC | 3 | 12 | 33 |
| Example 2 | β-SiC | 3 | 12 | 39 |
| Example 3 | β-SiC | 3 | 12 | 23 |
| Example 4 | β-SiC | 3 | 12 | 18 |
| Example 5 | β-SiC | 3 | 12 | 10 |
| Example 6 | β-SiC | 1 | 12 | 32 |
| Example 7 | β-SiC | 0.5 | 12 | 32 |
| Example 8 | β-SiC | 0.3 | 12 | 32 |
| Example 9 | β-SiC | 0.1 | 12 | 31 |
| Example 10 | β-SiC | 3 | 12 | 32 |
| Example 11 | β-SiC | 3 | 12 | 33 |
| Example 12 | β-SiC | 3 | 12 | 33 |
| Example 13 | β-SiC | 3 | 12 | 33 |
| Example 14 | β-SiC | 3 | 12 | 29 |
| Example 15 | β-SiC | 3 | 12 | 33 |
| Example 16 | β-SiC | 3 | 12 | 26 |
| Example 17 | β-SiC | 3 | 12 | 33 |
| Example 18 | β-SiC | 3 | 12 | 33 |
| Example 19 | β-SiC | 3 | 12 | 32 |
| Example 20 | β-SiC | 3 | 12 | 32 |
| Example 21 | β-SiC | 3 | 12 | 31 |
| Example 22 | β-SiC | 3 | 12 | 33 |
| Comparative Example 1 | — | | | |
| Comparative Example 2 | Alumina/mullite | 0.21 | 8 | 10 |
| Comparative Example 3 | β-SiC | 3 | 12 | 4 |

Example 2

The procedures of Example 1 were repeated except that a bonding material was prepared as follows, to manufacture a honeycomb structure. Specifically, 280 g of silicon powder having an average particle diameter of 5 μm (a density of 2.33 g/cm³) was used. 75 g of silicon carbide powder having an average particle diameter of 43 μm (a density of 3.17 g/cm³) was used. 25 g of nickel powder having an average particle diameter of 1 μm was used. 59 g of carbon fibers having an average fiber diameter of 12 and an average fiber length of 3 mm were used. 30 g of resin powder having an average particle diameter of 100 μm (a density of 0.02 g/cm³) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 2 was 12 μm and an average fiber length thereof was 3 mm.

Example 3

The procedures of Example 1 were repeated except that a bonding material was prepared as follows, to manufacture a honeycomb structure. Specifically, 239 g of silicon powder having an average particle diameter of 5 μm (a density of 2.33 g/cm³) was used. 172 g of silicon carbide powder having an average particle diameter of 43 μm (a density of 3.17 g/cm³) was used. 27 g of nickel powder having an average particle diameter of 1 μm was used. 36 g of carbon fibers having an average fiber diameter of 12 μm and an average fiber length of 3 mm were used. 30 g of resin powder having an average particle diameter of 100 μm (a density of 0.02 g/cm³) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 3 was 12 μl and an average fiber length thereof was 3 mm.

Example 4

The procedures of Example 1 were repeated except that a bonding material was prepared as follows, to manufacture a honeycomb structure. Specifically, 225 g of silicon powder having an average particle diameter of 5 μm (a density of 2.33 g/cm³) was used. 201 g of silicon carbide powder having an average particle diameter of 43 μm (a density of 3.17 g/cm³) was used. 28 g of nickel powder having an average particle diameter of 1 μm was used. 29 g of carbon fibers having an average fiber diameter of 12 μm and an average fiber length of 3 mm were used. 30 g of resin powder having an average particle diameter of 100 μm (a density of 0.02 g/cm³) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 4 was 12 μm and an average fiber length thereof was 3 mm.

Example 5

The procedures of Example 1 were repeated except that a bonding material was prepared as follows, to manufacture a honeycomb structure. Specifically, 201 g of silicon powder having an average particle diameter of 5 μm (a density of 2.33 g/cm$^3$) was used. 258 g of silicon carbide powder having an average particle diameter of 43 μm (a density of 3.17 g/cm$^3$) was used. 29 g of nickel powder having an average particle diameter of 1 μm was used. 16 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 5 was 12 μm and an average fiber length thereof was 3 mm.

Example 6

The procedures of Example 1 were repeated except that a bonding material was prepared as follows, to manufacture a honeycomb structure. Specifically, 262 g of silicon powder having an average particle diameter of 5 μm (a density of 2.33 g/cm$^3$) was used. 116 g of silicon carbide powder having an average particle diameter of 43 μm (a density of 3.17 g/cm$^3$) was used. 26 g of nickel powder having an average particle diameter of 1 μm was used. 49 g of carbon fibers having an average fiber diameter of 12 μm and an average fiber length of 1 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 6 was 12 μm and an average fiber length thereof was 1 mm.

Example 7

The procedures of Example 1 were repeated except that a bonding material was prepared as follows, to manufacture a honeycomb structure. Specifically, 262 g of silicon powder having an average particle diameter of 5 μm (a density of 2.33 g/cm$^3$) was used. 116 g of silicon carbide powder having an average particle diameter of 43 μm (a density of 3.17 g/cm$^3$) was used. 26 g of nickel powder having an average particle diameter of 1 μm was used. 49 g of carbon fibers having an average fiber diameter of 12 μm and an average fiber length of 0.5 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 7 was 12 μm and an average fiber length thereof was 0.5 mm.

Example 8

The procedures of Example 1 were repeated except that a bonding material was prepared as follows, to manufacture a honeycomb structure. Specifically, 262 g of silicon powder having an average particle diameter of 5 μm (a density of 2.33 g/cm$^3$) was used. 116 g of silicon carbide powder having an average particle diameter of 43 μm (a density of 3.17 g/cm$^3$) was used. 26 g of nickel powder having an average particle diameter of 1 μm was used. 49 g of carbon fibers having an average fiber diameter of 12 μm and an average fiber length of 0.3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 8 was 12 μm and an average fiber length thereof was 0.3 mm.

Example 9

The procedures of Example 1 were repeated except that a bonding material was prepared as follows, to manufacture a honeycomb structure. Specifically, 262 g of silicon powder having an average particle diameter of 5 μm (a density of 2.33 g/cm$^3$) was used. 116 g of silicon carbide powder having an average particle diameter of 43 μm (a density of 3.17 g/cm$^3$) was used. 26 g of nickel powder having an average particle diameter of 1 μm was used. 49 g of carbon fibers having an average fiber diameter of 12 μm and an average fiber length of 0.1 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 9 was 12 μm and an average fiber length thereof was 0.1 mm.

Example 10

The procedures of Example 1 were repeated except that a bonding material was prepared as follows, to manufacture a honeycomb structure. Specifically, 171 g of silicon powder having an average particle diameter of 5 μm (a density of 2.33 g/cm$^3$) was used. 242 g of silicon carbide powder having an average particle diameter of 43 μm (a density of 3.17 g/cm$^3$) was used. 26 g of nickel powder having an average particle diameter of 1 μm was used. 49 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 10 was 12 μm and an average fiber length thereof was 3 mm.

Example 11

The procedures of Example 1 were repeated except that a bonding material was prepared as follows, to manufacture a honeycomb structure. Specifically, 185 g of silicon powder having an average particle diameter of 5 μm (a density of 2.33 g/cm$^3$) was used. 222 g of silicon carbide powder having an average particle diameter of 43 μm (a density of 3.17 g/cm$^3$) was used. 26 g of nickel powder having an average particle diameter of 1 μm was used. 49 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 11 was 12 μm and an average fiber length thereof was 3 mm.

Example 12

The procedures of Example 1 were repeated except that a bonding material was prepared as follows, to manufacture a honeycomb structure. Specifically, 224 g of silicon powder having an average particle diameter of 5 μl (a density of 2.33 g/cm$^3$) was used. 169 g of silicon carbide powder having an average particle diameter of 43 μm (a density of 3.17 g/cm$^3$) was used. 26 g of nickel powder having an average particle diameter of 1 μm was used. 49 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 12 was 12 μm and an average fiber length thereof was 3 mm.

Example 13

The procedures of Example 1 were repeated except that a bonding material was prepared as follows, to manufacture a honeycomb structure. Specifically, 308 g of silicon powder having an average particle diameter of 5 μm (a density of 2.33 g/cm$^3$) was used. 53 g of silicon carbide powder having an average particle diameter of 43 μm (a density of 3.17 g/cm$^3$) was used. 26 g of nickel powder having an average particle diameter of 1 μm was used. 49 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 13 was 12 μm and an average fiber length thereof was 3 mm.

Example 14

The procedures of Example 1 were repeated except that a bonding material was prepared as follows, to manufacture a honeycomb structure. Specifically, 248 g of silicon powder having an average particle diameter of 5 μm (a density of 2.33 g/cm$^3$) was used. 142 g of silicon carbide powder having an average particle diameter of 43 μm (a density of 3.17 g/cm$^3$) was used. 8 g of nickel powder having an average particle diameter of 1 μm was used. 50 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 14 was 12 μl and an average fiber length thereof was 3 mm.

Example 15

The procedures of Example 1 were repeated except that a bonding material was prepared as follows, to manufacture a honeycomb structure. Specifically, 240 g of silicon powder having an average particle diameter of 5 μm (a density of 2.33 g/cm$^3$) was used. 137 g of silicon carbide powder having an average particle diameter of 43 μm (a density of 3.17 g/cm$^3$) was used. 47 g of nickel powder having an average particle diameter of 1 μm was used. 48 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 15 was 12 μm and an average fiber length thereof was 3 mm.

Example 16

The procedures of Example 1 were repeated except that a bonding material was prepared as follows, to manufacture a honeycomb structure. Specifically, 259 g of silicon powder having an average particle diameter of 5 μm (a density of 2.33 g/cm$^3$) was used. 116 g of silicon carbide powder having an average particle diameter of 43 μm (a density of 3.17 g/cm$^3$) was used. 34 g of zirconium powder having an average particle diameter of 3 μm was used. 49 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. In Example 16, after the bonding material was fired, zirconium silicide ($ZrSi_2$) was formed as a metal silicide in a bonding layer. A density of this zirconium silicide ($ZrSi_2$) was 5.2 g/cm$^3$. An average fiber diameter of "conductive inorganic fibers made of β-SiC formed by silicifying the carbon fibers" included in the bonding layer of the honeycomb structure of Example 16 was 12 μm and an average fiber length thereof was 3 mm.

Example 17

The procedures of Example 1 were repeated except that a bonding material was prepared as follows, to manufacture a honeycomb structure. Specifically, 224 g of silicon powder having an average particle diameter of 5 μm (a density of 2.33 g/cm$^3$) was used. 169 g of silicon carbide powder having an average particle diameter of 56 μm (a density of 3.17 g/cm$^3$) was used. 26 g of nickel powder having an average particle diameter of 1 μm was used. 49 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 17 was 12 μm and an average fiber length thereof was 3 mm.

Example 18

The procedures of Example 1 were repeated except that a bonding material was prepared as follows, to manufacture a honeycomb structure. Specifically, 224 g of silicon powder having an average particle diameter of 5 μm (a density of 2.33 g/cm$^3$) was used. 169 g of silicon carbide powder having an average particle diameter of 83 μm (a density of 3.17 g/cm$^3$) was used. 26 g of nickel powder having an average particle diameter of 1 μm was used. 49 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 18 was 12 μm and an average fiber length thereof was 3 mm.

Example 19

The procedures of Example 1 were repeated except that a bonding material was prepared as follows, to manufacture a honeycomb structure. Specifically, 262 g of silicon powder having an average particle diameter of 5 μm (a density of 2.33 g/cm$^3$) was used. 116 g of silicon carbide powder having an average particle diameter of 12 μm (a density of 3.17 g/cm$^3$) was used. 26 g of nickel powder having an average particle diameter of 1 μm was used. 49 g of carbon fibers having an average fiber diameter of 12 μm and an average fiber length of 3 mm were used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 19 was 12 μm and an average fiber length thereof was 3 mm.

Example 20

The procedures of Example 1 were repeated except that a bonding material was prepared as follows, to manufacture a honeycomb structure. Specifically, 178 g of silicon powder having an average particle diameter of 5 μm (a density of 2.33 g/cm$^3$) was used. 213 g of silicon carbide powder having an average particle diameter of 43 μm (a density of 3.17 g/cm$^3$) was used. 25 g of nickel powder having an average particle diameter of 1 μm was used. 47 g of carbon fibers having an average fiber diameter of 12 μm and an average fiber length of 3 mm were used. 19 g of cordierite powder having an average particle diameter of 2 μm (a density of 2.65 g/cm$^3$) was used. 30 g of resin powder having an average particle diameter of 100 μm (a density of 0.02 g/cm$^3$), 2.5 g of methylcellulose, 50 g of glycerin, 5 g of polyoxyethylene phenyl ether and 250 g of water were used. These materials were kneaded by a mixer, to prepare the bonding material. In Example 20, the cordierite powder was contained in the bonding material, and hence an oxide originating from the cordierite powder was also contained in a bonding layer obtained by firing the bonding material. That is, in Example 20, cordierite was contained as "a non-fibrous oxide" in the bonding layer. In a "type" column of "the non-fibrous oxide" of Table 1, a type of non-fibrous oxide contained in the bonding layer is shown. In Table 1, the above-mentioned oxide being cordierite is described as "MgO—Al$_2$O$_3$—SiO$_2$". Furthermore, in an "amount (parts by volume)" column of "the non-fibrous oxide" of Table 1, there is shown a volume ratio (parts by volume) of "the non-fibrous oxide" in a case where a total volume of silicon, silicon carbide, inorganic fibers and a metal silicide is 100 parts by volume. An average fiber diameter of "conductive inorganic fibers made of β-SiC formed by silicifying the carbon fibers" included in the bonding layer of the honeycomb structure of Example 20 was 12 μm and an average fiber length thereof was 3 mm.

Example 21

The procedures of Example 1 were repeated except that a bonding material was prepared as follows, to manufacture a honeycomb structure. Specifically, 172 g of silicon powder having an average particle diameter of 5 μm (a density of 2.33 g/cm$^3$) was used. 206 g of silicon carbide powder having an average particle diameter of 43 μm (a density of 3.17 g/cm$^3$) was used. 24 g of nickel powder having an average particle diameter of 1 μm was used. 46 g of carbon fibers having an average fiber diameter of 12 μm and an average fiber length of 3 mm were used. 37 g of cordierite powder having an average particle diameter of 2 μm (a density of 2.65 g/cm$^3$) was used. 30 g of resin powder having an average particle diameter of 100 μm (a density of 0.02 g/cm$^3$) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 21 was 12 μm and an average fiber length thereof was 3 mm.

Example 22

The procedures of Example 1 were repeated except that a bonding material was prepared as follows, to manufacture a honeycomb structure. Specifically, 262 g of silicon powder having an average particle diameter of 5 μm (a density of 2.33 g/cm$^3$) was used. There was used 116 g of silicon carbide powder having an average particle diameter of 43 μm (a density of 3.17 g/cm$^3$) where a plurality of brands containing different types and amounts of impurities were mixed. 26 g of nickel powder having an average particle diameter of 1 μm was used. 49 g of carbon fibers having an average fiber diameter of 12 μm and an average fiber length of 3 mm were used.

30 g of resin powder having an average particle diameter of 100 μm (a density of 0.02 g/cm³) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Example 22 was 12 μm and an average fiber length thereof was 3 mm.

Comparative Example 1

The procedures of Example 1 were repeated except that a bonding material was prepared as follows, to manufacture a honeycomb structure. Specifically, 66 g of silicon powder having an average particle diameter of 5 μm (a density of 2.33 g/cm³) was used. 135 g of silicon carbide powder having an average particle diameter of 43 μm (a density of 3.17 g/cm³) was used. 9 g of cordierite powder having an average particle diameter of 2 μm (a density of 2.65 g/cm³) was used. 10 g of resin powder having an average particle diameter of 100 μm (a density of 0.02 g/cm³) was used. 1 g of methylcellulose, 20 g of glycerin and 110 g of water were used. These materials were kneaded by a mixer, to prepare the bonding material.

Comparative Example 2

The procedures of Example 1 were repeated except that a bonding material was prepared as follows, to manufacture a honeycomb structure. Specifically, 84 g of silicon powder having an average particle diameter of 5 μm (a density of 2.33 g/cm³) was used. 91 g of silicon carbide powder having an average particle diameter of 43 μm (a density of 3.17 g/cm³) was used. 4 g of cordierite powder having an average particle diameter of 2 μm (a density of 2.65 g/cm³) was used. 24 g of alumina fibers of $Al_2O_3/SiO_2=80/20$ (a mass ratio) (a density of 3.28 g/cm³) were used. 10 g of resin powder having an average particle diameter of 100 μm (a density of 0.02 g/cm³) was used. 1 g of methylcellulose, 20 g of glycerin and 110 g of water were used. These materials were kneaded by a mixer, to prepare the bonding material. An average fiber diameter of "inorganic fibers" included in a bonding layer of the honeycomb structure of Comparative Example 2 was 8 μm and an average fiber length thereof was 210 μm.

Comparative Example 3

The procedures of Example 1 were repeated except that a bonding material was prepared as follows, to manufacture a honeycomb structure. Specifically, 190 g of silicon powder having an average particle diameter of 5 μm (a density of 2.33 g/cm³) was used. 228 g of silicon carbide powder having an average particle diameter of 43 μm (a density of 3.17 glare) was used. 50 g of carbon fibers having an average fiber diameter of 12 μm and an average fiber length of 3 mm were used. 30 g of resin powder having an average particle diameter of 100 μm (a density of 0.02 g/cm³) was used. 2.5 g of methylcellulose, 50 g of glycerin, 5 g of polyoxyethylene phenyl ether and 250 g of water were used. These materials were kneaded by a mixer, to prepare the bonding material. An average fiber diameter of "conductive inorganic fibers made of β-SiC formed by silicifying the carbon fibers" included in a bonding layer of the honeycomb structure of Comparative Example 3 was 12 μm and an average fiber length thereof was 3 mm.

Furthermore, as to the honeycomb structures of Examples 1 to 22 and Comparative Examples 1 to 3, a porosity (%) of the bonding layer, a volume resistivity (Ωcm) of the bonding layer, breaking-resistance property (μm), strength (MPa), a resistance rise ratio (%) and a hollow fiber percentage (%) were measured by the following method. The results are shown in Table 3.

(Porosity (%) of Bonding Layer)

A portion in which the bonding layer was formed was buried in a resin, and a cross section of the honeycomb structure in a direction perpendicular to an extending direction of cell was photographed by a scanning type electron microscope (SEM). The porosity of the bonding layer was measured from the photographed sectional image.

(Volume Resistivity (Ωcm) of Bonding Layer)

Figure 10:
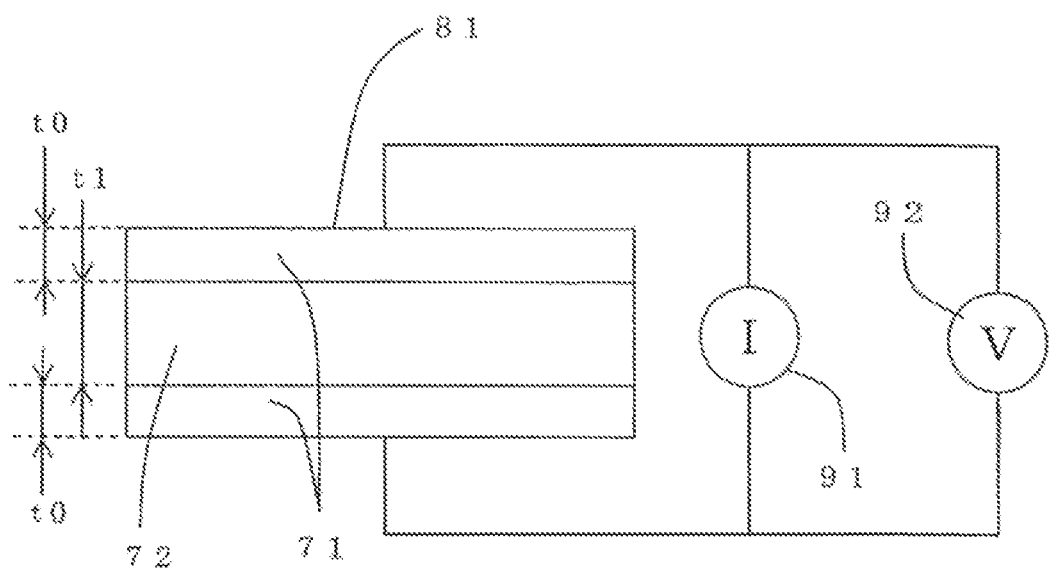
FIG. 10 is a schematic view for explaining a measuring method of a volume resistivity of a bonding layer.

As shown in FIG. 10, a part of a bonding layer 72 is cut out from the honeycomb structure, to prepare a volume resistivity measuring sample 81 for measuring a volume resistivity of the bonding layer 72. The volume resistivity measuring sample 81 is a quadrangular columnar having a vertical size of 16 mm, a lateral size of 16 mm and any height (as long as the bonding layer 72 is sandwiched between partition walls 71). The volume resistivity of the bonding layer 72 is measured by a two-terminal method, by use of this volume resistivity measuring sample 81. FIG. 10 is a schematic view for explaining the measuring method of the volume resistivity of the bonding layer. In FIG. 10, reference numeral 91 is an ammeter and reference numeral 92 is a voltmeter. Here, a volume resistivity ρ (Ωcm) of the bonding layer can be obtained in accordance with Equation (1) described in the following. Moreover, in FIG. 10, "t0" indicates a thickness of the partition wall 71. Furthermore, "t1" indicates a thickness of the bonding layer 72.

$$\rho=(R1-R0)\times W/t1 \qquad (1),$$

wherein ρ is the volume resistivity (Ωcm) of the bonding layer. R1 is a resistance value (Ω) obtained by the measurement in FIG. 10. R0 is a resistance value (Ω) of the only partition walls 71 of FIG. 10. However, the resistance value (Ω) of the only partition walls 71 is a resistance value in a case where thicknesses of the respective partition walls 71 disposed on both surfaces of the bonding layer 72 have the same value (i.e., the thickness t0) and the partition walls 71 have the thicknesses of two partition walls (i.e., a thickness of "2×t0"). W is a sectional area of the volume resistivity measuring sample 81 shown in FIG. 10. The sectional area of the volume resistivity measuring sample 81 of FIG. 10 is 16 mm×16 mm=256 mm². t1 is a thickness of the bonding layer.

(Breaking-Resistance Property (Ωm))

Figure 11:
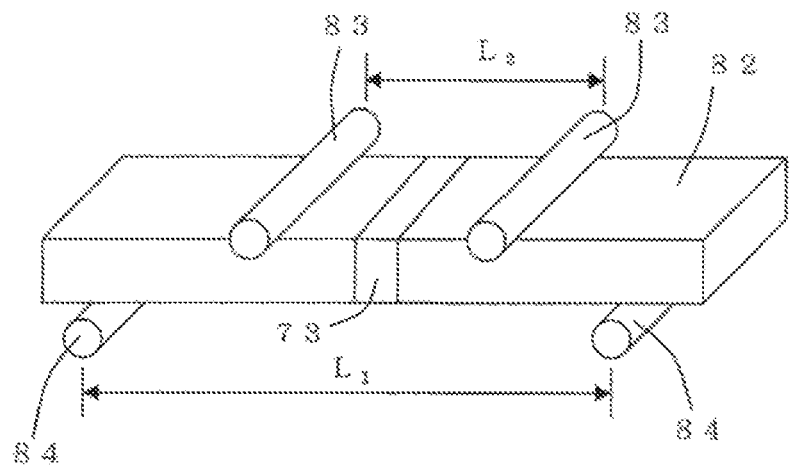
FIG. 11 is a schematic view for explaining a test method of a bending test of the bonding layer.
Figure 12:
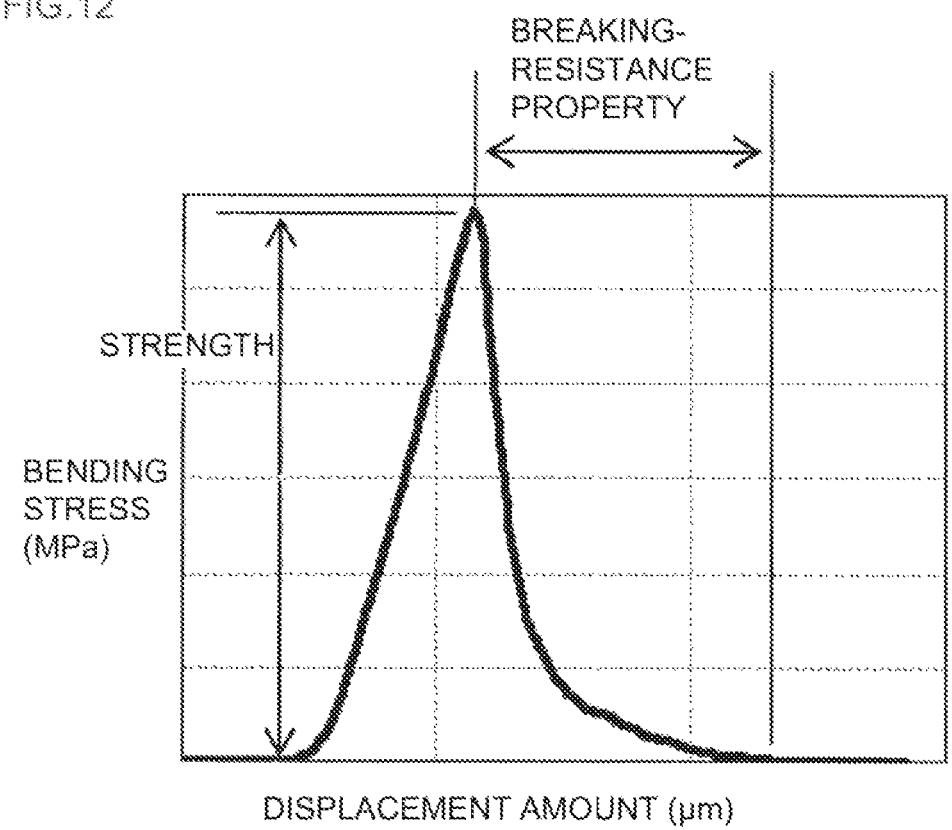
FIG. 12 is a graph showing one example of the measurement result of the bending test.

A part of the bonding layer is cut out from the honeycomb structure, a bending test is carried out by using the cut sample, and breaking-resistance property (μm) are obtained from the test result. Specifically, as shown in FIG. 11, a part of a bonding layer 73 is first cut out from the honeycomb structure, and a sample 82 for the bending test to measure the breaking-resistance property of the bonding layer 73 is prepared. The sample 82 for the bending test is a quadrangular columnar having a vertical size of 60 mm or more, a lateral size of 20 mm and a height of 10 mm. As shown in FIG. 11, a four-points bending test is carried out by using this sample 82 for the bending test. In the four-points bending test, a space $L_2$ between two inner support points 83 and 83 is 20 mm. A space $L_1$ between two outer support points 84 and 84 is 60 mm. Then, from this four-points bending test, a graph is prepared as shown in FIG. 12. In the graph shown in FIG. 12, the horizontal axis indicates a displacement amount (μm) of the sample for the bending test, and the vertical axis indicates bending stress (MPa) applied to the sample for the bending test. As shown in FIG. 12, a displacement amount (μm) from a vertex of a peak of a displacement amount-bending stress curve (the maximum value of the bending stress) to a foot of the peak of the displacement amount-bending stress curve (the foot on a side on which the displacement amount is large) indicates "the breaking-resistance property (μm)". Here, FIG. 11 is a schematic view for explaining the test method of the bending test of the bonding layer. FIG. 12 is a graph showing one example of the measurement result of the four-points bending test.

(Strength (MPa))

A part of the bonding layer is cut out from the honeycomb structure, the bending test is carried out by using the cut sample, and strength (MPa) is obtained from the test result. It is to be noted that the measuring method of the bending test is carried out by the same method as in the bending test in the breaking-resistance property (μm). From the four-points bending test, a graph shown in FIG. 12 is prepared. The vertex of the peak of the displacement amount-bending stress curve (the maximum value of the bending stress) (MPa) is "the strength (MPa) of the bonding layer".

(Resistance Rise Ratio (%))

Figure 13:
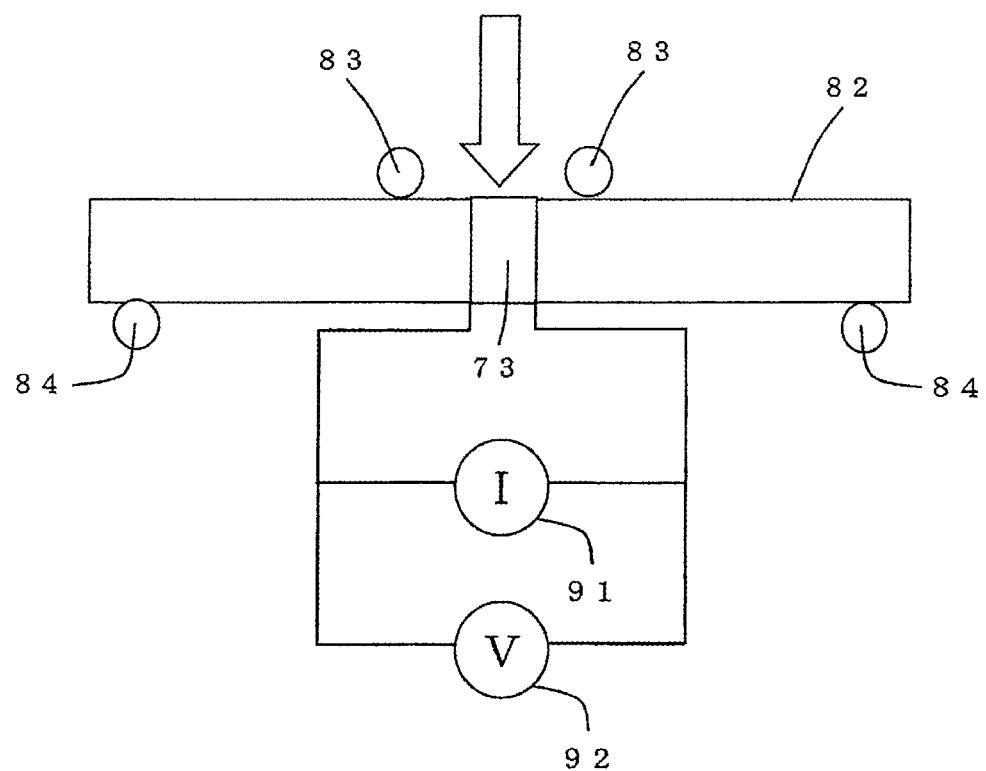
FIG. 13 is a schematic view for explaining a measuring method of a resistance rise ratio.

During the bending test of the evaluation of the above breaking-resistance property, an electrical resistance value of the sample for the bending test (hereinafter, also referred to simply as "the resistance value") is measured. Specifically, as shown in FIG. 13, a part of the bonding layer 73 is cut out, to prepare the sample 82 for the bending test for measuring the breaking-resistance property of the bonding layer 73. The sample 82 for the bending test is the same as the sample for use in the bending test of the evaluation of the breaking-resistance property. A resistance value (Ω) of a portion sandwiching the bonding layer 73 is measured on a lower surface (a portion to which tensile stress is applied) in the bending test, while carrying out the four-points bending test by use of the sample 82 for the bending test. It is to be noted that in FIG. 13, the bending test is carried out by the same method as the test method of the bending test shown in FIG. 11, except that the measurement portion of the resistance value (Ω) of the sample 82 for the bending test is different. Here, FIG. 13 is a schematic view for explaining the measuring method of the resistance rise ratio. In FIG. 13, reference numeral 91 is an ammeter and reference numeral 92 is a voltmeter. In FIG. 13, the same elements as those shown in FIG. 11 are denoted with the same reference numerals to omit the description. Furthermore, the resistance rise ratio (%) is calculated in accordance with Equation (2) described in the following, where "R2" is a resistance value (Ω) of the sample for the bending test prior to the bending test, and "R3" is a resistance value (Ω) of the sample for the bending test immediately before the sample breaks during the bending test. That is, the resistance rise ratio (%) is a percentage (%) of "a value of a difference between the resistance value R2 (Ω) and the resistance value R3 (Ω)" to the resistance value R2.

$$\text{Resistance rise ratio (\%)} = (R3-R2)/R2 \times 100 \quad (2)$$

(Hollow Fiber Percentage (%))

Cross sections of 50 inorganic fibers were photographed at a magnification of 200 times, to count the number of hollow inorganic fibers in 50 inorganic fibers. Then, a ratio (the percentage) of the hollow inorganic fibers to the 50 inorganic fibers was obtained as "the hollow fiber percentage (%)."

TABLE 3

| | Porosity (%) | Volume resistivity (Ωcm) | Breaking-resistance property (μm) | Strength (MPa) | Resistance rise ratio (%) | Hollow fiber percentage (%) |
|---|---|---|---|---|---|---|
| Ex. 1 | 70 | 26 | 80 | 1.2 | 0.0% | 4% |
| Ex. 2 | 71 | 27 | 85 | 0.8 | 0.0% | 8% |
| Ex. 3 | 68 | 23 | 70 | 1.9 | 0.1% | 4% |
| Ex. 4 | 66 | 22 | 55 | 2.6 | 0.7% | 4% |
| Ex. 5 | 60 | 19 | 10 | 4.2 | 3.1% | 2% |
| Ex. 6 | 64 | 20 | 55 | 2.6 | 0.5% | 6% |
| Ex. 7 | 62 | 18 | 40 | 3.1 | 1.3% | 6% |
| Ex. 8 | 61 | 17 | 30 | 3.4 | 2.0% | 6% |
| Ex. 9 | 60 | 17 | 5 | 3.7 | 3.2% | 8% |
| Ex. 10 | 78 | 48 | 105 | 0.6 | 0.0% | 6% |
| Ex. 11 | 77 | 42 | 95 | 0.8 | 0.0% | 4% |
| Ex. 12 | 74 | 32 | 90 | 0.9 | 0.0% | 4% |
| Ex. 13 | 66 | 22 | 70 | 1.5 | 0.0% | 2% |
| Ex. 14 | 67 | 30 | 75 | 1.0 | 0.9% | 14% |
| Ex. 15 | 72 | 27 | 90 | 1.1 | 0.0% | 2% |
| Ex. 16 | 69 | 29 | 70 | 1.0 | 1.8% | 22% |
| Ex. 17 | 75 | 48 | 90 | 0.6 | 0.0% | 4% |
| Ex. 18 | 77 | 83 | 95 | 0.4 | 0.0% | 4% |
| Ex. 19 | 68 | 19 | 75 | 2.6 | 0.0% | 6% |
| Ex. 20 | 74 | 34 | 85 | 1.0 | 0.2% | 6% |
| Ex. 21 | 71 | 30 | 75 | 1.3 | 0.5% | 10% |
| Ex. 22 | 70 | 96 | 80 | 1.2 | 0.0% | 4% |
| Comp. Ex. 1 | 65 | 12 | 0 | 3.0 | — | — |
| Comp. Ex. 2 | 68 | 20 | 100 | 2.4 | 3.8% | 0% |
| Comp. Ex. 3 | 68 | 89 | 15 | 1.0 | 3.7% | 100% |

Furthermore, in Table 4, amounts of impurities in silicon (the silicon powder) used in the respective examples and comparative examples are shown. It is to be noted that in Table 4, a ratio (at %) of a number of atoms of the impurity to a number of atoms of silicon is shown.

TABLE 4

| Amount of impurity in silicon | |
|---|---|
| Fe | 0.22 at % |
| Al | 0.31 at % |
| Ca | 0.04 at % |
| Ti | 0.02 at % |
| P | 0.004 at % |
| B | 0.005 at % |

(Results)

As shown in Table 3, in the honeycomb structures of Examples 1 to 22, the volume resistivity of each bonding layer was low, and the breaking-resistance property (μm) and strength (MPa) were also suitable. Moreover, the resistance rise ratio (%) was remarkably small as compared with Comparative Examples 2 and 3. That is, it has been found that even when the bending stress is applied to the bonding layer, the electrical resistance value of the bonding layer is hard to rise and a suitable conductivity can be maintained. Additionally, in the honeycomb structures of Examples 1 to 22 and Comparative Examples 1 to 3, the volume resistivities of the honeycomb segments at 400° C. were 40 Ωcm.

Hereinafter, the results shown in Table 3 will be considered for each of the examples and comparative examples. (1) In Example 1, as described above, the volume resistivity of the bonding layer was low, and the breaking-resistance property (μm) and the strength (MPa) were also suitable. Furthermore, the resistance rise ratio (%) during the bending test was 0.0%. (2) In Example 2, the conductive inorganic fibers were increased as much as 6% and silicon carbide was decreased as much as 8% in contrast to Example 1, with the result that the breaking-resistance property was enhanced, but the strength was reduced. Furthermore, a viscosity of the bonding material for preparing the bonding layer was high. Furthermore, the amount of silicon carbide was small, and hence a resistance adjusting range of the bonding layer was narrow. (3) In Example 3, the conductive inorganic fibers were decreased as much as 10% in contrast to Example 1, with the result that the breaking-resistance property was reduced, but the resistance rise ratio hardly changed. (4) In Example 4, the conductive inorganic fibers were decreased as much as 5% in contrast to Example 3, with the result that the breaking-resistance property was reduced and the resistance rise ratio was further increased. (5) In Example 5, the conductive inorganic fibers were decreased as much as 8% in contrast to Example 4, with the result that the breaking-resistance property was noticeably reduced. Further, the resistance rise ratio was also increased. (6) In Example 6, the average fiber length of the conductive inorganic fibers was shortened in contrast to Example 1, with the result that the breaking-resistance property was reduced and the resistance rise ratio was increased. (7) In Example 7, the average fiber length of the conductive inorganic fibers was shortened in contrast to Example 6, with the result that the breaking-resistance property was further reduced and the resistance rise ratio was also increased. (8) In Example 8, the average fiber length of the conductive inorganic fibers was further shortened in contrast to Example 7, with the result that the breaking-resistance property was reduced and the resistance rise ratio was also increased. (9) In Example 9, the average fiber length of the conductive inorganic fibers was shortened in contrast to Example 8, with the result that the breaking-resistance property was noticeably reduced and the resistance rise ratio was also increased.

(10) In Example 10, the amount of silicon was decreased in contrast to Example 11, with the result that the breaking-resistance property was enhanced, but the strength was reduced. (11) In Example 11, the amount of silicon was decreased in contrast to Example 12, with the result that the breaking-resistance property was enhanced, but the strength was reduced. (12) In Example 12, the amount of silicon was decreased in contrast to Example 1, with the result that the breaking-resistance property was enhanced, but the strength was reduced. (13) In Example 13, the amount of silicon was increased in contrast to Example 1, with the result that the strength was increased, but the breaking-resistance property was reduced. (14) In Example 14, the amount of nickel silicide was decreased in contrast to Example 1, with the result that the reaction ratio of "Si+C→SiC" in the bonding material was lowered (the percentage of the hollow fibers was increased). Therefore, the fiber amount of the conductive inorganic fibers made of β-SiC formed from the carbon fibers was decreased. Therefore, the resistance rise ratio of the bonding layer was increased. (15) In Example 15, the amount of nickel silicide was increased in contrast to Example 12, with the result that there were not any large property changes, but the thermal expansion ratio was increased. (16) In Example 16, nickel silicide was changed to zirconium silicide in contrast to Example 1, with the result that the reaction ratio of "Si+C→SiC" in the bonding material was lowered (the percentage of the hollow fibers was increased). Therefore, the fiber amount of the conductive inorganic fibers made of β-SiC formed from the carbon fibers was decreased. In consequence, the resistance rise ratio of the bonding layer was increased.

(17) In Example 17, the average particle diameter of silicon carbide was increased in contrast to Example 1, with the result that the strength was reduced. (18) In Example 18, the average particle diameter of silicon carbide was increased in contrast to Example 17, with the result that the strength was reduced. (19) In Example 19, the average particle diameter of silicon carbide was small in contrast to Example 1, with the result that the strength was increased. (20) In Example 20, in contrast to Example 11, the non-fibrous oxide was added, with the result that the strength was increased. (21) In Example 21, in contrast to Example 20, the amount of the non-fibrous oxide was increased, with the result that the strength was increased. (22) In Example 22, in contrast to Example 1, silicon carbide of different type and amount of impurities were mixed, with the result that the volume resistivity was increased. (23) In Comparative Example 1, any inorganic fibers were not added, with the result that any breaking-resistance property was not exhibited. (24) In Comparative Example 2, the alumina fibers were added, with the result that the breaking-resistance property was exhibited, but the resistance rise ratio was large. (25) In Comparative Example 3, in contrast to Example 11, since any metal silicide was not contained, the reaction ratio of "Si+C→SiC" in the bonding material was noticeably reduced (the percentage of the hollow fibers noticeably was increased), whereby all of the volume resistivity, the breaking-resistance property and the resistance rise ratio deteriorated.

INDUSTRIAL APPLICABILITY

A honeycomb structure of the present invention can suitably be utilized as a catalyst carrier for an exhaust gas purifying device which purifies an exhaust gas of a car.

DESCRIPTION REFERENCE SYMBOLS

1 and 41: partition wall, 2 and 42: cell, 3: outer peripheral wall, 4 and 44: honeycomb segment bonded body, 5 and 45: side surface, 6 and 46: honeycomb segment, 7, 47, 71 and 72: bonding layer, 7A: both-ends contact linear portion, 7B: non-contact transverse linear portion, 7C: non-contact vertical linear portion, 7D: one-end contact linear portion, 11 and 51: first end face, 12 and 52: second end face, 21 and 61: electrode member, 81: volume resistivity measuring sample, 82: sample for a bending test, 83: inner support point, 84: outer support point, 91: ammeter, 92: voltmeter, 100, 200, 300 and 400: honeycomb structure, A: end portion, B: end portion, 0: center, a: central angle, and θ: angle of 0.5 times the central angle.

What is claimed is:

1. A honeycomb structure comprising a tubular honeycomb segment bonded body having a plurality of tubular honeycomb segments having porous partition walls defining a plurality of cells as through channels of a fluid which extend from a first end face as one end face to a second end face as another end face, and a bonding layer which bonds side surfaces of the plurality of honeycomb segments to each other; and a pair of electrode members disposed on a side surface of the honeycomb segment bonded body, wherein volume resistivities of the respective honeycomb segments of the honeycomb segment bonded body are from 1 to 200 Ωcm, at least a part of the bonding layer is made of a bonding material having conductive property, a volume resistivity of the bonding layer is from 2 to 2000 Ωcm, each of the pair of electrode members is formed into a band shape extending in an extending direction of the cells of the honeycomb segment bonded body, and in a cross section perpendicular to the extending direction of the cells, the one electrode member in the pair of electrode members is disposed on an opposite side across the center of the honeycomb segment bonded body with respect to another electrode member in the pair of electrode members, and in at least a part of the bonding layer, conductive inorganic fibers made of β-SiC and a metal silicide are included in a porous body where particles of silicon carbide as an aggregate are bound with silicon as a binding material in a state where pores are held among the particles.

2. The honeycomb structure according to claim 1, wherein the metal silicide is nickel silicide.

3. The honeycomb structure according to claim 1, wherein in a region of the bonding layer where the conductive inorganic fibers are included, a volume ratio of the conductive inorganic fibers to a total volume of the silicon, the silicon carbide, the conductive inorganic fibers, and the metal silicide included in the bonding layer is from 15 to 35 vol %.

4. The honeycomb structure according to claim 1, wherein a ratio of hollow conductive inorganic fibers in the conductive inorganic fibers is 30% or less.

5. The honeycomb structure according to claim 1, wherein an average fiber length of the conductive inorganic fibers is 0.3 mm or more.

6. The honeycomb structure according to claim 1, wherein an average fiber diameter of the conductive inorganic fibers is from 2 to 30 μm.

7. The honeycomb structure according to claim 1, wherein the conductive inorganic fibers made of β-SiC are produced by silicifying carbon fibers.

8. The honeycomb structure according to claim 1, wherein a volume ratio of a total volume of the silicon and the metal silicide to the total volume of the silicon, the particles of silicon carbide, the conductive inorganic fibers and the metal silicide included in the bonding layer is from 20 to 50 vol %.

9. The honeycomb structure according to claim 1, wherein a volume ratio of the metal silicide to the total volume of the silicon, the particles of silicon carbide, the conductive inorganic fibers and the metal silicide included in the bonding layer is from 1 to 10 vol %.

10. The honeycomb structure according to claim 1, wherein a volume ratio of the particles of silicon carbide to the total volume of the silicon, the particles of silicon carbide, the conductive inorganic fibers and the metal silicide included in the bonding layer is from 20 to 50 vol %.

11. The honeycomb structure according to claim 1, wherein an average particle diameter of the particles of the silicon carbide included in the bonding layer is from 10 to 60 μm.

12. The honeycomb structure according to claim 1, wherein the particles of silicon carbide as the aggregate is α-SiC.

13. The honeycomb structure according to claim 1, wherein the bonding layer further comprises an oxide made of an alkaline earth metal oxide, $Al_2O_3$ and $SiO_2$.

14. The honeycomb structure according to claim 13, wherein the alkaline earth metal oxide is MgO.

15. The honeycomb structure according to claim 13, wherein the oxide of 1 to 10 parts by volume are included when the total volume of the silicon, the silicon carbide, the conductive inorganic fibers and the metal silicide included in the bonding layer is 100 parts by volume.

16. The honeycomb structure according to claim 1, wherein a porosity of the bonding layer is from 60 to 80%.

17. A manufacturing method of a honeycomb structure comprising forming a plurality of tubular honeycomb segments having porous partition walls defining a plurality of cells as through channels of a fluid which extend from a first end face as one end face to a second end face as another end face; bonding the segments together using a bonding layer which bonds side surfaces of the plurality of honeycomb segments to each other to form a tubular honeycomb segment bonded body, and forming a pair of electrode members on a side surface of the tubular honeycomb segment bonded body, wherein as a bonding material to form the bonding layer, there is used a material comprising silicon carbide powder, silicon powder, carbon fibers, and powder made of at least one of a metal of at least one selected from the group consisting of nickel and zirconium, and a metal compound containing a metal element of the at least one selected from the group consisting of nickel and zirconium, volume resistivities of the respective honeycomb segments of the honeycomb segment bonded body are from 1 to 200 Ωcm, at least a part of the bonding layer is made of a bonding material having conductive property, a volume resistivity of the bonding layer is from 2 to 2000 Ωcm, each of the pair of electrode members is formed into a band shape extending in an extending direction of the cells of the honeycomb segment bonded body, and in a cross section perpendicular to the extending direction of the cells, the one electrode member in the pair of electrode members is disposed on an opposite side across the center of the honeycomb segment bonded body with respect to another electrode member in the pair of electrode members, and in at least a part of the bonding layer, conductive inorganic fibers made of β-SiC and a metal silicide are included in a porous body where particles of silicon carbide as an aggregate are bound with silicon as a binding material in a state where pores are held among the particles.

18. The manufacturing method of the honeycomb structure according to claim 17, wherein the metal compound containing the metal element of the at least one selected from the group consisting of nickel and zirconium is at least one of a metal oxide and a metal silicide.

* * * * *